(12) United States Patent
Takami et al.

(10) Patent No.: US 7,727,676 B2
(45) Date of Patent: Jun. 1, 2010

(54) NONAQUEOUS ELECTROLYTE SECONDARY BATTERY

(75) Inventors: Norio Takami, Yokohama (JP);
Hiroyuki Hasebe, Chigasaki (JP);
Takahisa Ohsaki, Yokohama (JP);
Motoya Kanda, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 496 days.

(21) Appl. No.: 11/454,925

(22) Filed: Jun. 19, 2006

(65) Prior Publication Data

US 2006/0234131 A1 Oct. 19, 2006

Related U.S. Application Data

(60) Continuation of application No. 10/279,077, filed on Oct. 24, 2002, which is a division of application No. 09/430,757, filed on Oct. 29, 1999, now Pat. No. 6,503,657.

(30) Foreign Application Priority Data

Oct. 29, 1998 (JP) ............................. 10-308476
Dec. 17, 1998 (JP) ............................. 10-359154

(51) Int. Cl.
*H01M 1/40* (2006.01)
(52) U.S. Cl. .............. 429/326; 429/231.95; 429/163
(58) Field of Classification Search ........... 429/231.95, 429/329, 330, 185, 231.8, 163
See application file for complete search history.

(56) References Cited

U.S. PATENT DOCUMENTS

| 5,037,713 A | 8/1991 | Toshino et al. |
|---|---|---|
| 5,079,109 A | 1/1992 | Takami et al. |
| 5,272,022 A | 12/1993 | Takami et al. |
| 5,437,692 A | 8/1995 | Dasgupta et al. |
| 5,498,492 A | 3/1996 | Hara et al. |
| 5,556,723 A | 9/1996 | Ohsaki et al. |
| 5,612,155 A | 3/1997 | Takami et al. |
| 5,753,387 A | 5/1998 | Takami et al. |
| 5,795,678 A | 8/1998 | Takami et al. |
| 6,030,728 A * | 2/2000 | Cotte et al. ............. 429/329 |

(Continued)

FOREIGN PATENT DOCUMENTS

EP 0 851 522 7/1998

(Continued)

OTHER PUBLICATIONS

U.S. Appl. No. 11/454,924, filed Jun. 19, 2006, Takami, et al.

*Primary Examiner*—Dah-Wei Yuan
*Assistant Examiner*—Monique Wills
(74) *Attorney, Agent, or Firm*—Oblon, Spivak, McClelland, Maier & Neustadt, L.L.P.

(57) ABSTRACT

The present invention provides a nonaqueous electrolyte secondary battery, comprising an electrode group including a positive electrode, a negative electrode including a material for absorbing-desorbing lithium ions, and a separator arranged between the positive electrode and the negative electrode, a nonaqueous electrolyte impregnated in the electrode group and including a nonaqueous solvent and a lithium salt dissolved in the nonaqueous solvent, and a jacket for housing the electrode group and having a thickness of 0.3 mm or less, wherein the nonaqueous solvent γ-butyrolactone in an amount larger than 50% by volume and not larger than 95% by volume based on the total amount of the nonaqueous solvent.

25 Claims, 2 Drawing Sheets

U.S. PATENT DOCUMENTS

| | | |
|---|---|---|
| 6,045,951 A | 4/2000 | Wendsjo et al. |
| 6,093,503 A * | 7/2000 | Isoyama et al. ............... 429/61 |
| 6,103,421 A | 8/2000 | Torata et al. |
| 6,106,978 A | 8/2000 | Takeuchi |
| 6,156,457 A | 12/2000 | Takami et al. |
| 6,342,319 B1 | 1/2002 | Kuboki et al. |
| 6,350,544 B1 | 2/2002 | Takami et al. |
| 6,423,447 B1 | 7/2002 | Ohsaki et al. |
| 6,465,125 B1 | 10/2002 | Takami et al. |
| 6,468,693 B1 | 10/2002 | Takami et al. |
| 6,495,291 B1 | 12/2002 | Kohno et al. |
| 6,541,157 B1 | 4/2003 | Inagaki et al. |
| 6,544,682 B1 | 4/2003 | Takami et al. |
| 6,589,690 B1 | 7/2003 | Sato et al. |

FOREIGN PATENT DOCUMENTS

| | | |
|---|---|---|
| JP | 4-337247 | 11/1992 |
| JP | 6-52896 | 2/1994 |
| JP | 7-85888 | 3/1995 |
| JP | 8-138686 | 5/1996 |
| JP | 8-321287 | 12/1996 |
| JP | 10-31285 | 5/1997 |
| JP | 10-172606 | 6/1998 |
| JP | 2830365 | 9/1998 |
| JP | 10-312825 | 11/1998 |
| JP | 1031285 | * 11/1998 |
| JP | 11-97062 | 4/1999 |
| WO | WO/9934460 | * 8/1999 |

* cited by examiner

NONAQUEOUS ELECTROLYTE SECONDARY BATTERY

BACKGROUND OF THE INVENTION

This application is a Continuation application of U.S. application Ser. No. 10/279,077, pending, which is a Divisional application of U.S. application Ser. No. 09/430,757, now U.S. Pat. No. 6,162,940.

BRIEF SUMMARY OF THE INVENTION

Recently, a lithium ion secondary battery has been put on the market as a nonaqueous electrolyte secondary battery for portable apparatuses such as portable phones. This battery uses lithium cobalt oxide (e.g., $LiCoO_2$) as a positive electrode active material, a graphite material or carbonaceous material as a negative electrode active material, an organic solvent having a lithium salt dissolved as a nonaqueous electrolyte, and a porous film as a separator. A nonaqueous solvent having a low viscosity and a low boiling point is used as a solvent of the electrolyte. For example, Japanese Patent Disclosure (Kokai) No. 4-14769 discloses a nonaqueous electrolyte secondary battery comprising an electrolyte including a mixed solvent consisting essentially of propylene carbonate, ethylene carbonate and γ-butyrolactone, the γ-butyrolactone occupying 10 to 50% by volume of the entire solvent mixture. On the other hand, Japanese Patent Disclosure (Kokai) No. 11-97062 discloses a nonaqueous electrolyte secondary battery using a nonaqueous electrolyte prepared by dissolving lithium borofluoride ($LiBF_4$) in a solvent consisting of 100% by volume of γ-butyrolactone.

It is of high importance nowadays to decrease the thickness of the secondary battery in accordance with decrease in the thickness of the portable apparatus. In order to decrease the thickness of the secondary battery, it is necessary to decrease the thickness of the jacket housing the positive electrode, the negative electrode, the separator, and the nonaqueous electrolyte. However, in the nonaqueous secondary battery provided with a nonaqueous electrolyte including a mixed solvent containing 10 to 50% by volume of γ-butyrolactone, a reaction takes place between the positive electrode and the nonaqueous electrolyte when the secondary battery is stored at such a high temperature as 60° C. or higher. As a result, the nonaqueous electrolyte is decomposed by oxidation to generate a gaseous material. And also, a gas material is likely to be generated from the negative electrode during the initial charging. What should be noted is that, if the thickness of the jacket is decreased, the jacket is swollen by the gas generation so as to be deformed. If the jacket is deformed, an electronic equipment cannot be housed in the battery. Alternatively, malfunction of the electronic equipment tends to be invited.

In the nonaqueous electrolyte secondary battery, it is also important to further improve the large discharge characteristics and the charge-discharge cycle characteristics.

An object of the present invention is to provide a nonaqueous electrolyte secondary battery that permits suppressing the gas generation during storage of the battery under high temperatures so as to prevent a jacket from being swollen and also permits improving the large discharge characteristics and the charge-discharge cycle life.

According to the present invention, there is provided a nonaqueous electrolyte secondary battery, comprising an electrode group including a positive electrode, a negative electrode containing a material for absorbing-desorbing lithium ions, and a separator arranged between the positive electrode and the negative electrode, a nonaqueous electrolyte impregnated in the electrode group and including a nonaqueous solvent and a lithium salt dissolved in the nonaqueous solvent, and a jacket for housing the electrode group and having a thickness of 0.3 mm or less, wherein the nonaqueous solvent contains γ-butyrolactone in an amount larger than 50% by volume and not larger than 95% by volume based on the total amount of the nonaqueous solvent.

According to the present invention, there is provided a nonaqueous electrolyte secondary battery, comprising an electrode group including a positive electrode, a negative electrode containing a material for absorbing-desorbing lithium ions, and a separator arranged between the positive electrode and the negative electrode, a nonaqueous electrolyte impregnated in the electrode group and including a nonaqueous solvent and a lithium salt dissolved in the nonaqueous solvent, and a jacket for housing the electrode group, the jacket being made of a sheet having a thickness of 0.5 mm or less including a resin layer, wherein the nonaqueous solvent contains γ-butyrolactone in an amount larger than 50% by volume and not larger than 95% by volume based on the total amount of the nonaqueous solvent.

Further, according to the present invention, there is provided a nonaqueous electrolyte secondary battery, comprising an electrode group including a positive electrode including a collector and a positive electrode layer formed on one or both surfaces of the collector and containing an active material, a negative electrode including a collector and a negative electrode layer formed on one or both surfaces of the collector and containing a material for absorbing-desorbing lithium ions, and a separator arranged between the positive electrode and the negative electrode, a nonaqueous electrolyte impregnated in the electrode group and including a nonaqueous solvent and a lithium salt dissolved in the nonaqueous solvent, and a jacket for housing the electrode group and having a thickness of 0.3 mm or less, wherein the positive electrode layer has a porosity lower than that of the negative electrode layer, the positive electrode layer has a thickness of 10 to 100 μm, and the nonaqueous solvent contains 40 to 95% by volume of γ-butyrolactone based on the total amount of the nonaqueous solvent.

Further, according to the present invention, there is provided a nonaqueous electrolyte secondary battery, comprising an electrode group including a positive electrode including a collector and a positive electrode layer formed on one or both surfaces of the collector and containing an active material, a negative electrode including a collector and a negative electrode layer formed on one or both surfaces of the collector and containing a material for absorbing-desorbing lithium ions, and a separator arranged between the positive electrode and the negative electrode, a nonaqueous electrolyte impregnated in the electrode group and including a nonaqueous solvent and a lithium salt dissolved in the nonaqueous solvent, and a jacket for housing the electrode group, the jacket being made of a sheet having a thickness of 0.5 mm or less including a resin layer, wherein the positive electrode layer has a porosity lower than that of the negative electrode layer, the positive electrode layer has a thickness of 10 to 100 μm, and the nonaqueous solvent contains 40 to 95% by volume of γ-butyrolactone based on the total amount of the nonaqueous solvent.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
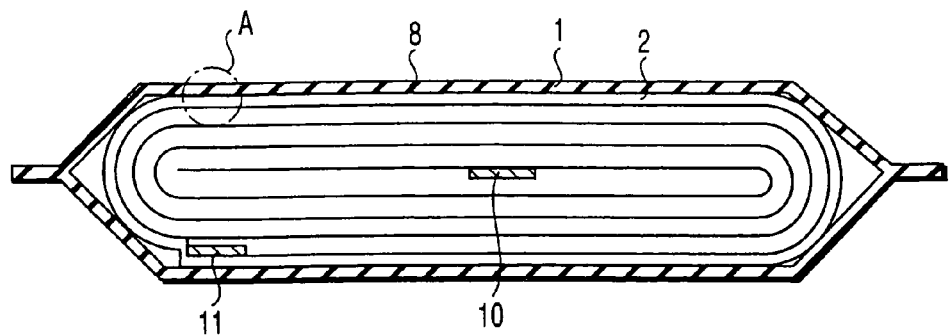
FIG. 1 is a cross sectional view exemplifying a nonaqueous electrolyte secondary battery according to first embodiment of the present invention.

A nonaqueous electrolyte secondary battery according to a first embodiment of the present invention comprises an electrode group having a positive electrode, a negative electrode for absorbing and desorbing lithium ions, and a separator interposed between the positive electrode and the negative electrode, a nonaqueous electrolyte permeating the electrode group to have the electrode group impregnated with the nonaqueous electrolyte and containing a nonaqueous solvent and a lithium salt dissolved in the nonaqueous solvent, and a jacket housing the electrode group. The nonaqueous solvent contains γ-butyrolactone in an amount larger than 50% by volume and not larger than 95% by volume based on the total amount of the nonaqueous solvent.

In the secondary battery of the present invention, it is possible for the positive electrode, the negative electrode and the separator not to be formed as an integral structure. However, it is desirable to form an integral structure under the conditions given in item (a) or (b):

(a) The positive electrode and the separator are adhered to each other by an adhesive polymer present in at least a part of the boundary therebetween, and the negative electrode and the separator are adhered to each other by an adhesive polymer present in at least a part of a boundary therebetween. Particularly, the positive electrode and the separator preferably be adhered to each other by an adhesive polymer dotted inside and at the boundary between the positive electrode and the separator. Also, the negative electrode and the separator preferably be adhered to each other by an adhesive polymer dotted inside and at the boundary between the negative electrode and the separator.

(b) The positive electrode, the negative electrode and the separator are made integral by thermally curing a binder contained in each of the positive electrode and the negative electrode.

The construction in any of items (a) and (b) given above makes it possible to further suppress the swelling of the jacket.

It is desirable for the secondary battery of the present invention to have a product between the battery capacity (Ah) and the battery internal impedance (mΩ) at 1 kHz of not smaller than 10 mΩ·Ah and not larger than 110 mΩ·Ah. Incidentally, the battery capacity denotes a nominal capacity or the discharge capacity at the time when the battery is discharged at a discharge rate of 0.2 C. More preferably, the product between the battery capacity and the battery internal impedance at 1 kHz should fall within a range of between 20 mΩ·Ah and 60 mΩ·Ah.

The product between the battery capacity and the battery internal impedance at 1 kHz can be set to fall within a range of between 10 mΩ·Ah and 110 mΩ·Ah by the "Manufacturing method (I)" or "Manufacturing method (II)" described later. In the Manufacturing method (I), the addition amount and distribution of the adhesive polymer and the initial charging conditions are set to permit the product between the battery capacity and the internal impedance should be set to fall within a range of between 10 mΩ·Ah and 110 mΩ·Ah. In the Manufacturing method (II), the temperature and the pressure in the pressing step for forming the electrode group and the initial charging conditions should be set to permit the product between the battery capacity and the internal impedance to fall within a range of between 10 mΩ·Ah and 110 mΩ·Ah.

The nonaqueous electrolyte secondary battery equipped with an electrode group meeting the conditions given in item (a) above will now be described.

1) Positive Electrode

This positive electrode has a structure in which an electrode layer containing an active material is carried by one or both surfaces of the collector. The positive electrode holds adhesive polymers in voids. The positive electrode layer preferably further contains a conducting agent and a binder.

Examples of the positive electrode active material are various oxides such as manganese dioxide, lithium manganese composite oxide, lithium-containing nickel oxide, lithium-containing cobalt oxide, lithium-containing nickel cobalt oxide, lithium-containing iron oxide, and lithium-containing vanadium oxide, and chalcogen compounds such as titanium disulfide and molybdenum disulfide. Of these materials, lithium-containing cobalt oxide (e.g., $LiCoO_2$), lithium-containing nickel cobalt oxide (e.g., $LiNi_{0.8}Co_{0.2}O_2$), and lithium manganese composite oxide (e.g., $LiMn_2O_4$ and $LiMnO_2$) are preferably used because high voltage can be obtained.

Examples of this conducting agent are one or more types of carbon materials selected from acetylene black, carbon black, and graphite.

The binder has functions of allowing the collector to hold the active material in place and binding particles of the active material to each other. As this binder, it is possible to use one or more types of polymers selected from polytetrafluoroethylene (PTA), ethylene-propylene-diene copolymer (EPODE), styrene-butadiene rubber (SBR), and polyvinylidene fluoride (PVdF).

It is desirable to set the mixing amount of the positive electrode active material at 80 to 95% by weight, the mixing amount of the conducting agent at 3 to 20% by weight, and the binder at 2 to 7% by weight.

As the collector, a porous conductive substrate or a conductive substrate having no pores can be used. These conductive substrates can be made from, e.g., aluminum, stainless steel, or nickel.

As this collector, it is particularly preferable to use a conductive substrate having a two-dimensional porous structure in which pores 3 mm or less in diameter exist at a ratio of one or more pores per 10 cm². That is, if the diameter of the pores formed in the conductive substrate is larger than 3 mm, no satisfactory positive electrode strength may be obtained. On the other hand, if the ratio of pores 3 mm or less in diameter is smaller than the above range, it becomes difficult to allow the nonaqueous electrolyte to uniformly permeate into the electrode group, so no satisfactory cycle life may be obtained. The pore diameter is preferably 0.1 to 1 mm. The pore ratio is preferably 10 to 20 pores per 10 cm².

The conductive substrate having a two-dimensional porous structure in which pores 3 mm or less in diameter exist at a ratio of one or more pores per 10 cm² preferably has a thickness of 15 to 100 μm. If the thickness is less than 15 μm, no satisfactory positive electrode strength may be obtained. If the thickness exceeds 100 μm, the battery weight and the electrode group thickness increase. This may make it difficult to well increase the weight energy density and volume energy density of the thin secondary battery. A more favorable range of the thickness is 30 to 80 μm.

2) Negative Electrode

The negative electrode has a structure in which an electrode layer containing an active material is carried by one or both surfaces of the collector. The negative electrode holds adhesive polymers in voids. The negative electrode layer preferably further contains a binder.

An example of the active material is a carbon material which absorbs and desorbs lithium ions. Examples of this carbon material are a graphitized material and carbonaceous material such as graphite, coke, carbon fibers, and spherical carbon, and a graphitized material and carbonaceous material obtained by heat-treating a thermosetting resin, isotropic pitch, mesophase pitch, mesophase pitch-based carbon fibers, and mesophase globules (mesophase pitch-based carbon fibers are particularly preferred because the battery capacity and the charge-discharge cycle characteristics can be improved) at 500 to 3,000° C. Of these materials, it is preferable to use a graphitized material obtained by heat-treating at 2,000° C. or more and having a graphite crystal in which an interplanar spacing $d_{002}$ derived from (002) reflection is 0.340 nm or less. It is possible to greatly improve the battery capacity and large discharge characteristic of a nonaqueous electrolyte secondary battery including a negative electrode containing this graphitized material as a carbon material. The interplanar spacing $d_{002}$ is more preferably 0.336 nm or less.

The binder used in the present invention includes, for example, polytetrafluoroethylene (PTA), polyvinylidene fluoride (PVdF), ethylene-propylene-diene copolymer (EPDM), styrene-butadiene rubber (SBR), and carboxymethylcellulose (CMC).

It is desirable to set the mixing amount of the carbon material at 90 to 98% by weight, the mixing amount of the binder at 2 to 20% by weight.

As the collector, a porous conductive substrate or a conductive substrate having no pores can be used. These conductive substrates can be made from, e.g., copper, stainless steel, or nickel.

As this collector, it is particularly preferable to use a conductive substrate having a two-dimensional porous structure in which pores 3 mm or less in diameter exist at a ratio of one or more pores per 10 cm². That is, if the diameter of the pores formed in the conductive substrate is larger than 3 mm, no satisfactory negative electrode strength may be obtained. On the other hand, if the ratio of pores 3 mm or less in diameter is smaller than the above range, it becomes difficult to allow the nonaqueous electrolyte to uniformly permeate into the electrode group, so no satisfactory cycle life may be obtained. The pore diameter is preferably 0.1 to 1 mm. The pore ratio is preferably 10 to 20 pores per 10 cm².

The conductive substrate having a two-dimensional porous structure in which pores 3 mm or less in diameter exist at a ratio of one or more pores per 10 cm² preferably has a thickness of 10 to 50 μm. If the thickness is less than 10 μm, no satisfactory negative electrode strength may be obtained. If the thickness exceeds 50 μm, the battery weight and the electrode group thickness increase. This may make it difficult to well increase the weight energy density and volume energy density of the thin secondary battery.

The negative electrode layer contains a carbon material capable of absorbing-desorbing lithium ions as described previously. In addition, it is possible for the negative electrode layer to contain metals such as aluminum, magnesium, tin, and silicon, a metal compound selected from the group consisting of a metal oxide, a metal sulfide, and a metal nitride, and a lithium alloy.

Examples of the metal oxide are tin oxide, silicon oxide, lithium titanium oxide, niobium oxide, and tungsten oxide.

Examples of the metal sulfide are tin sulfide and titanium sulfide.

Examples of the metal nitride are lithium cobalt nitride, lithium iron nitride, and lithium manganese nitride.

Examples of the lithium alloy are lithium aluminum alloy, lithium tin alloy, lithium lead alloy, and lithium silicon alloy.

3) Separator

This separator is made from, for example, a porous sheet.

As this porous sheet, for example, a porous film or a nonwoven fabric can be used. The porous sheet is preferably made from at least one type of material selected from, e.g., polyolefin and cellulose. Examples of polyolefin are polyethylene and polypropylene. Of these materials, a porous film made from one or both of polyethylene and polypropylene is preferred because the safety of the secondary battery can be improved.

The thickness of the porous sheet is preferably 30 μm or less. If the thickness exceeds 30 μm, the distance between the positive and negative electrodes increases, and this may increase the internal resistance. The lower limit of the thickness is preferably 5 μm. If the thickness is less than 5 μm, the separator strength may significantly lower to allow easy internal short circuit. The upper limit of the thickness is more preferably 25 μm, and its lower limit is more preferably 10 μm.

The heat shrinkage ratio of the porous sheet upon being left to stand at 120° C. for 1 hr is preferably 20% or less. If this heat shrinkage ratio exceeds 20%, it may become difficult to obtain satisfactory adhesion strength between the positive and negative electrodes and the separator. The heat shrinkage ratio is more preferably 15% or less.

The porous sheet preferably has a porosity of 30 to 60% for the reasons explained below. If the porosity is less than 30%, good electrolyte holding properties may become difficult to obtain in the separator. On the other hand, if the porosity exceeds 60%, no satisfactory separator strength may be obtained. A more favorable range of the porosity is 35 to 50%.

The air permeability of the porous sheet is preferably 600 sec/100 cm³ or less. The term "air permeability" represents the time (second) required for 100 cm³ of air to permeate through a porous sheet. If the air permeability exceeds 600 sec/100 cm$^3$, high lithium ion mobility may become difficult to obtain in the separator. The lower limit of this air permeability is preferably 100 sec/100 cm$^3$. If the air permeability is less than 100 sec/100 cm$^3$, no satisfactory separator strength may be obtained. The upper limit of the air permeability is more preferably 500 sec/100 cm$^3$, and most preferably 400 sec/100 cm$^3$. The lower limit of the air permeability is more preferably 150 sec/100 cm$^3$.

4) Nonaqueous Electrolyte

The nonaqueous electrolyte used in the present invention is prepared by dissolving a lithium salt in a mixed nonaqueous solvent containing γ-butyrolactone (BL) as a main component. The BL content of the mixed nonaqueous solvent should fall within a range of larger than 50% by volume and not larger than 95% by volume. If the BL content is not more than 50% by volume, a gas is likely to be generated under high temperatures. Also, where the mixed nonaqueous solvent contains BL and a cyclic carbonate; the ratio of the cyclic carbonate is rendered relatively high, leading to a high viscosity of the solvent and to a low conductivity of the nonaqueous electrolyte. As a result, the charge-discharge cycle characteristics, the large discharge characteristics and the discharge characteristics under low temperatures, e.g., about −20° C., are deteriorated. On the other hand, if the BL content exceeds 95% by weight, a reaction takes place between the negative electrode and BL so as to impair the charge-discharge cycle characteristics. To be more specific, if the nonaqueous electrolyte is reduced and decomposed as a result of the reaction between BL and the negative electrode containing, for example, a carbon material absorbing-desorbing lithium ions, a film inhibiting the charge-discharge reaction is formed on the surface of the negative electrode. As a result, a current concentration tends to be generated in the negative electrode so as to bring about problems. For example, lithium metal is precipitated on the surface of the negative electrode. Also, the impedance at the interface of the negative electrode is increased so as to lower the charge-discharge efficiency of the negative electrode and, thus, to impair the charge-discharge cycle characteristics. Preferably, the BL content of the nonaqueous solvent should fall within a range of between 60% by volume and 95% by volume. Where the BL content falls within the range noted above, the gas generation during storage of the secondary battery under high temperatures can be suppressed more effectively. Also, it is possible to further improve the discharge capacity under low temperatures about −20° C. More preferably, the BL content of the nonaqueous solvent should fall within a range of between 65% by volume and 90% by volume.

It is desirable to use a cyclic carbonate together with BL in the present invention because the cyclic carbonate permits improving the charge-discharge efficiency.

The cyclic carbonate used in the present invention includes, for example, propylene carbonate (PC), ethylene carbonate (EC), vinylene carbonate (VC), and trifluoropropylene carbonate (TFPC). Particularly, if EC is used together with BL, the charge-discharge characteristics and the large discharge characteristics can be markedly improved. It is also desirable to prepare a mixed solvent by mixing BL with at least one kind of a third solvent selected from the group consisting of PC, VC, TFPC, diethyl carbonate (DEC), methyl ethyl carbonate (MEC) and an aromatic compound. The mixed solvent of the particular construction permits improving the charge-discharge cycle characteristics.

In order to decrease the viscosity of the mixed solvent, it is possible for the nonaqueous solvent containing BL to further contain 20% by volume or less of a solvent having a low viscosity selected from the group consisting of, for example, a chain carbonate, a chain ether, and a cyclic ether.

Preferred combinations of the nonaqueous solvents used in the present invention include, for example, a combination of BL and EC, a combination of BL and PC, a combination of BL, EC and DEC, a combination of BL, EC and MEC, a combination of BL, EC, MEC and VC, a combination of BL, EC and VC, a combination of BL, PC and VC, and a combination of BL, EC, PC and VC. In this case, it is desirable to set the mixing ratio of EC to fall within a range of between 5 and 40% by volume. It should be noted in this connection that, if the mixing amount of EC is smaller than 5% by volume, it is difficult to cover densely the surface of the negative electrode with a protective film, giving rise to a possibility that a reaction may take place between the negative electrode and BL. As a result, it is difficult to improve sufficiently the charge-discharge cycle characteristics. On the other hand, if the mixing amount of EC exceeds 40% by volume, the viscosity of the nonaqueous electrolyte is unduly increased so as to lower the ionic conductance. As a result, it is difficult to improve sufficiently the charge-discharge cycle characteristics, the large discharge characteristics, and the low temperature discharge characteristics. More preferably, the EC amount should fall within a range of between 10 and 35% by volume. Also, the solvent consisting of at least one compound selected from the group consisting of DEC, MEC, PC and VC serves to forms a dense protective film on the surface of the negative electrode so as to lower the impedance at the interface of the negative electrode. The addition amount of any of these solvents is not particularly limited as far as it is possible to obtain the particular function described above. It should be noted, however, that, if the mixing ratio of at least one solvent selected from the group consisting of DEC, MEC, PC and VC exceeds 10% by volume, it is difficult to prevent sufficiently the nonaqueous electrolyte from being decomposed by oxidation under high temperatures. Alternatively, the viscosity of the nonaqueous electrolyte tends to be increased so as to lower the ionic conductance. Therefore, it is desirable to use at least one solvent selected from the group consisting of DEC, MEC, PC and VC in an amount not exceeding 10% by volume. More preferably, at least one of these solvents should be used in an amount of 2% by volume or less. On the other hand, the lower limit in the addition amount of at least one of these solvents should be 0.001% by volume, preferably, 0.05% by volume.

Particularly, it is desirable for the nonaqueous solvent to contain BL, EC and VC. The BL content is larger than 50% by volume and not larger than 95% by volume. The nonaqueous electrolyte secondary battery comprising a nonaqueous electrolyte containing the nonaqueous solvent noted above and a negative electrode containing a carbon material capable of absorbing-desorbing lithium ions permits markedly lowering the impedance at the interface of the negative electrode and also permits suppressing the metal lithium precipitation on the negative electrode so as to improve the charge-discharge efficiency of the negative electrode. As a result, it is possible to suppress the gas generation during storage of the secondary battery under high temperatures, thereby preventing a jacket having a thickness of 3 mm or less from being deformed while realizing an excellent large discharge characteristics and a long life. It is considered reasonable to understand that the reasons for such a prominent improvement of the negative electrode characteristics are as follows. Specifically, in the secondary battery, a protective film consisting of EC is formed on the surface of the negative electrode, and a thin and dense film consisting of VC is further formed on the surface of the negative electrode. It is considered reasonable to understand that the reaction between BL and the negative electrode is inhibited, thereby lowering the impedance and preventing the metal lithium precipitation.

It is possible to use a nonaqueous solvent containing BL in an amount larger than 50% by volume and not larger than 95% by volume, EC and an aromatic compound in place of the mixed nonaqueous solvent of the composition described previously. The aromatic compound is at least one compound selected from the group consisting of benzene, toluene, xylene, biphenyl and terphenyl. EC is deposited on the surface of the negative electrode containing, for example, a carbon material capable of absorbing-desorbing lithium ions so as to form a protective film, thereby suppressing the reaction between the negative electrode and BL. In this case, it is desirable for the mixed nonaqueous solvent to contain 5 to 40% by volume of EC for the reasons described previously. Preferably, the EC content should fall within a range of between 10% by volume and 35% by volume. On the other hand, the benzene ring of the aromatic compound tends to be adsorbed easily on the surface of the negative electrode containing, for example, a carbon material capable of absorbing-desorbing lithium ions so as to suppress the reaction between BL and the negative electrode. As described above, the nonaqueous electrolyte based on a mixed nonaqueous-solvent containing BL in an amount larger than 50% by volume and not larger than 95% by volume, EC and an aromatic compound makes it possible to suppress sufficiently the reaction between the negative electrode and BL so as to improve the charge-discharge cycle characteristics of the secondary battery. It is desirable for the mixed nonaqueous solvent to further contain at least one solvent selected from the group consisting of DEC, MEC, PC, TFPC and VC. By adding at least one solvent selected from the group consisting of DEC, MEC, PC, TFPC and VC, the reaction between the negative electrode and BL can be suppressed more effectively, leading to a further improvement in the charge-discharge cycle characteristics. Particularly, it is desirable to use VC as an additional solvent. The addition amount of a third solvent consisting of at least one compound selected from the group consisting of an aromatic compound, DEC, MEC, PC, TFPC and VC is not particularly limited. In other words, the addition amount can be determined appropriately as far as the particular function described above can be performed. It should be noted, however, that, if the mixing ratio of the third solvent exceeds 10% by volume, it is difficult to suppress sufficiently the decomposition of the nonaqueous electrolyte by oxidation under high temperatures. Alternatively, the viscosity of the nonaqueous electrolyte tends to be increased so as to lower the ionic conductance. Naturally, it is desirable for the volume ratio of the third solvent in the nonaqueous solvent to be at most 10% by volume. Preferably, the volume ratio of the third solvent should be at most 2% by volume. On the other hand, the lower limit of the volume ratio of the third component should be 0.001% by volume, preferably 0.05% by volume.

Examples of the electrolytic salt contained in the nonaqueous electrolyte are lithium salts such as lithium perchlorate ($LiClO_4$), lithium hexafluoride ($LiPF_6$), lithium borofluoride ($LiBF_4$), lithium arsenic hexafluoride ($LiAsF_6$), lithium trifluoromethasulfonate ($LiCF_3SO_3$), and bistrifluoromethylsulfonylimide lithium [$LiN(CF_3SO_2)_2$]. Of these lithium salts, $LiPF_6$ and $LiBF_4$ are most preferred.

The amount of the electrolytic salt dissolved in the nonaqueous solvent should desirably be 0.5 to 2.0 mol/l (liter).

The amount of nonaqueous electrolyte is preferably 0.2 to 0.6 g per 100 mAh of battery unit capacity for the reasons explained below. If the nonaqueous electrolyte amount is less than 0.2 g/100 mAh, it may become impossible to well maintain the ion conductivity of the positive and negative electrodes. On the other hand, if the nonaqueous electrolyte amount exceeds 0.6 g/100 mAh, this large electrolyte amount may make sealing difficult when a film jacket is used. A more favorable range of the nonaqueous electrolyte amount is 0.4 to 0.55 g/100 mAh.

5) Adhesive Polymer

As the adhesive polymer, it is possible to use one or more types of polymers selected from the group consisting of polyacrylonitrile (PAN), polyacrylate (PMMA), polyvinylidene fluoride (PVdF), polyvinyl chloride (PVC), and polyethylene oxide (PEO). It is desirable for this adhesive polymer to be kept highly adhesive while this adhesive polymer holds the nonaqueous electrolyte in place. More preferably, this adhesive polymer should have high lithium ion conductivity. PAN, PMMA, PVdF, PVC and PEO are examples of the polymer that is highly adhesive while holding the nonaqueous electrode in place and has a high lithium ion conductivity. Of these polymers, PVdF is most preferred. PVdF can hold the nonaqueous electrolyte in place and partially gels in the presence of the nonaqueous electrolyte. This further improves the ion conductivity of the positive electrode.

It is desirable for the adhesive polymer to assume a porous structure having fine pores within the cavities of the positive electrode, the negative electrode, and the separator. The adhesive polymer assuming a porous structure is capable of holding the nonaqueous electrolyte.

The total amount of adhesive polymers contained in the battery is preferably 0.1 to 6 mg per 100 mAh battery capacity for the reasons explained below. If the total amount of adhesive polymers is less than 0.1 mg per 100 mAh battery capacity, it may become difficult to well increase the adhesion strength between the positive electrode and the separator and between the negative electrode and the separator. On the other hand, if the total amount exceeds 6 mg per 100 mAh battery capacity, the lithium ion conductivity of the secondary battery may decrease, or its internal resistance may increase. This may make it difficult to well improve the discharge capacity, large discharge characteristic, and charge/discharge cycle life. A more preferable range of the total amount of adhesive polymers is 0.2 to 1 mg per 100 mAh battery capacity.

6) Jacket

A first jacket made of a sheet having a thickness of 0.5 mm or less including a resin layer or a second jacket having a thickness of 0.3 mm or less is used in the present invention. Each of the first and second jackets is light in weight, making it possible to increase the energy density per unit weight of the battery. However, each of these jackets, which are flexible, tend to be deformed by the gas generated from the electrode group or from the nonaqueous electrolyte.

The resin layer included in the first jacket performs the function of a protective layer and can be made of, for example, polyethylene or polypropylene. To be more specific, the first jacket consists of a sheet comprising a metal layer and protective layers formed on both surfaces of the metal layer. The metal layer, which serves to shield water, can be made of, for example, aluminum, stainless steel, iron, copper or nickel. Particularly, it is desirable to use an aluminum layer that is light in weight and high in its function of shielding water. The metal layer can be formed of a single metal layer. Alternatively, a plurality of metal layers can be bonded to each other to form the metal layer included in the first jacket. The protective layer formed on the outer surface of the metal layer serves to prevent a damage done to the metal layer. The outer protective layer can be formed of a single resin layer. Alternatively, a plurality of resin layers can be laminated one upon the other to form the outer protective layer. On the other hand, the protective layer formed on the inner surface of the metal layer serves to prevent the metal layer from being corroded by the nonaqueous electrolyte. The inner protective layer can be formed of a single resin layer. Alternatively, a plurality of resin layers can be laminated one upon the other to form the inner protective layer. It is also possible to form a heat-fusible resin (for example thermoplastic adhesive) layer on the surface of the inner protective layer.

If the thickness of the first jacket exceeds 0.5 mm, the capacity per unit weight of the battery is lowered. The thickness of the first jacket should desirably be 0.3 mm or less, more preferably 0.25 mm or less, and most preferably 0.15 mm or less. On the other hand, the lower limit of the thickness should desirably be set at 0.05 mm. If the thickness is smaller than 0.05 mm, the first jacket tends to be deformed and broken. The lower limit of the thickness should more desirably be 0.08 mm and most desirably be 0.1 mm.

As the second jacket, a metal can or a film having a function of shielding water can be used. An example of the film is a laminate film including a metal layer and a flexible synthetic resin layer formed on at least a portion of the metal layer. Examples of the metal layer are aluminum, stainless steel, iron, copper, and nickel. Of these metals, aluminum that is light in weight and has a high function of shielding water is preferred. Examples of the synthetic resin are polyethylene and polypropylene.

If the second jacket is thicker than 0.3 mm, the secondary battery cannot be made sufficiently thin, resulting in failure to obtain a sufficiently high weight energy density. It is desirable for the second jacket to have a thickness of 0.25 mm or less and, more preferably 0.15 mm or less. On the other hand, the lower limit in the thickness of the second jacket should desirably be set at 0.05 mm. If the second jacket is thinner than 0.05 mm, the second jacket tends to be deformed and broken. The lower limit in the thickness of the second jacket should more preferably be 0.08 mm and most desirably be 0.1 mm. Particularly, the thickness of the second jacket should desirably fall within a range of between 0.05 mm and 0.3 mm, and more preferably within a range of between 0.08 mm and 0.15 mm.

For measuring the thickness of the jacket, three optional points apart from each other by at least 1 cm are selected within a region excluding the sealing portion of the jacket, and the thickness in each of these three points is actually measured. The measured values are averaged to determine the thickness of the jacket. If a foreign matter such as a resin is attached to the surface of the jacket, the thickness is measured after removal of the foreign matter. For example, where PVdF is attached to the surface of the jacket, the PVdF is removed by wiping off the surface of the jacket with a dimethylformamide solution, followed by measuring the thickness of the jacket.

When this film jacket is used, the electrode group is desirably adhered to the inner surface of the jacket by an adhesive layer formed on at least a portion of the surface of the electrode group. With this arrangement, the jacket can be fixed to the surface of the electrode group. So, it is possible to prevent the nonaqueous electrolyte from permeating into the boundary between the electrode group and the jacket.

A thin lithium ion secondary battery as an example of the nonaqueous electrolyte secondary battery according to the present invention will now be described below with reference to FIGS. 1 and 2.

FIG. 1 is a sectional view showing this example of the first nonaqueous electrolyte secondary battery according to the present invention. FIG. 2 is an enlarged sectional view showing a portion A in FIG. 1. FIG. 3 is a schematic view showing the boundaries and their vicinities of a positive electrode, separator, and negative electrode in the secondary battery shown in FIG. 1.

As shown in FIG. 1, a jacket 1 made of, for example, a film surrounds an electrode group 2. This electrode group 2 has a structure formed by spirally winding a stack including a positive electrode, negative electrode, and separator, and compression-molding the coil in the direction of diameter. As shown in FIG. 2, the stack is formed by stacking a separator 3; a positive electrode 12 including a positive electrode layer 4, a positive electrode collector 5, and a positive electrode layer 4; a separator 3; a negative electrode 13 including a negative electrode layer 6, a negative electrode collector 7, and a negative electrode layer 6; a separator 3; a positive electrode 12 including a positive electrode layer 4, a positive electrode collector 5, and a positive electrode layer 4; a separator 3; and a negative electrode 13 including a negative electrode layer 6, and a negative electrode collector 7 in this order as seen from the lower side in the drawing. The negative electrode collector 7 is the outermost layer of the electrode group 2. An adhesive layer 8 is present on the surface of the electrode group 2. The adhesive layer 8 is adhered to the inner surface of the jacket 1. As shown in FIG. 3, in voids of the positive electrode layer 4, the separator 3, and the negative electrode layer 6, an adhesive polymer 9 is held, respectively. The positive electrode 12 and the separator 3 are adhered to each other by adhesive polymers 9 that are dispersedly present in the positive electrode layer 4 and the separator 3 and in a boundary between the positive electrode layer 4 and the separator 3. The negative electrode 13 and the separator 3 are adhered to each other by adhesive polymers 9 that are dispersedly present in the negative electrode layer 6 and the separator 3 and in a boundary between the negative electrode layer 6 and the separator 3. The electrode group 2 in the jacket 1 is impregnated with a nonaqueous electrolyte. A band-like positive electrode lead 10 has one end connected to the positive electrode collector 5 of the electrode group 2 and the other end extending from the jacket 1. A band-like negative electrode lead 11 has one end connected to the negative electrode collector 7 of the electrode group 2 and the other end extending from the jacket 1.

In FIG. 1, the adhesive layer 8 is formed on the entire surface of the electrode group 2. However, this adhesive layer 8 can also be formed only on a portion of the surface of the electrode group 2, though it is desirable to form the adhesive layer 8 on at least a surface corresponding to the outermost circumferential surface of the electrode group. Further, it is possible to omit the adhesive layer 8.

The nonaqueous electrolyte secondary battery provided with an electrode group meeting the conditions given in item (a) described previously can be manufactured by, for example, the manufacturing method (I) described below. Of course, the manufacturing method of the nonaqueous electrolyte secondary battery of the present invention is not limited to the method described below as far as the manufacturing method falls within the scope defined in the present invention.

<Manufacturing Method (I)>

(First Step)

A porous sheet used as a separator is interposed between positive and negative electrodes to form an electrode group.

This electrode group is desirably formed by any of: spirally winding positive and negative electrodes with a separator not containing an adhesive polymer interposed between them; spirally winding a positive and negative electrodes with a separator not containing an adhesive polymer interposed between them and compressing the spiral or coil in the direction of diameter; and folding positive and negative electrodes a plurality of times with a separator not containing an adhesive polymer interposed between them. When the electrode group is formed by any of these methods, in a second step (to be described later) it is possible to allow a solution of an adhesive polymer to permeate the positive electrode, negative electrode, and separator and at the same time prevent this solution from permeating the whole boundary between the positive electrode and the separator and the whole boundary between the negative electrode and the separator. Consequently, the adhesive polymer can be dispersedly present in the positive electrode, negative electrode, and separator and can be dispersedly present in a boundary between the positive electrode and the separator and in a boundary between the negative electrode and the separator.

The positive electrode is formed by suspending an active material, conducting agent, and binder in an appropriate solvent, coating a collector with this suspension, and drying the collector to form a thin plate. Examples of the active material, conducting agent, binder, and collector are materials similar to those enumerated above in the explanation of 1) Positive electrode.

The negative electrode is formed by kneading a carbon material which absorbs and desorbs lithium ions and binder in the presence of a solvent, coating a collector with the resultant suspension, drying the collector, and pressing the collector once or 2 to 5 times with desired pressure. Examples of the carbonaceous material, binder, and collector are materials similar to those enumerated above in the explanation of 2) Negative electrode.

The separator not containing an adhesive polymer is made of, e.g., a porous sheet. Examples of the porous sheet is material similar to those enumerated above in the explanation of 3) Separator.

(Second Step)

The electrode group is housed in a bag-like film jacket. In this case it is desirable that the stacked section of this electrode group be seen through the opening of the jacket. A solution prepared by dissolving an adhesive polymer in a solvent is injected into the electrode group in the jacket to impregnate the electrode group with the solution.

Examples of the film jacket are materials analogous to those enumerated above in the explanation of 6) Jacket.

Examples of the adhesive polymer are materials analogous to those enumerated above in the explanation of 5) Adhesive polymer. Of these polymers, polyvinylidene fluoride is most preferred.

The solvent is desirably an organic solvent having a boiling point of 200° C. or less. Dimethylformamide (boiling point 153° C.) is an example of this organic solvent. If the boiling point of the organic solvent exceeds 200° C., a long drying time may be necessary when the temperature of drying (to be described later) is set at 100° C. or less. The lower limit of the organic solvent boiling point is preferably 50° C. If the organic solvent boiling point is lower than 50° C., the organic solvent may evaporate while the solution is injected into the electrode group. The upper-limit of the boiling point is more preferably 180° C., and its lower limit is more preferably 100° C.

The concentration of the adhesive polymer in the solution is preferably 0.05 to 2.5 wt % for the following reasons. If the concentration is less than 0.05 wt %, it may become difficult to adhere the positive electrode and the separator, and the negative electrode and the separator, with sufficient strength. On the other hand, if the concentration exceeds 2.5 wt %, it may become difficult to obtain enough porosity to hold the nonaqueous electrolyte in place, and the interface impedance of the electrode may increase. If the interface impedance increases, the capacity and the large discharge characteristic greatly degrade. A more favorable range of the concentration is 0.1 to 1.5 wt %.

When the concentration of the adhesive polymer in the solution is 0.05 to 2.5 wt %, the injection amount of solution is preferably 0.1 to 2 ml per 100 mAh battery capacity for the following reasons. If the injection amount is less than 0.1 ml, it may become difficult to well improve the adhesion strength between the positive electrode and the separator and between the negative electrode and the separator. On the other hand, if the injection amount exceeds 2 ml, the lithium ion conductivity of the secondary battery may decrease, or its internal resistance may increase. This may make it difficult to improve the discharge capacity, large discharge characteristic, and charge/discharge cycle life. A more favorable range of the injection amount is 0.15 to 1 ml per 100 mAh battery capacity.

(Third step)

The electrode group is dried in a vacuum to evaporate the solvent in the solution. By this step, adhesive polymers are held in voids of the positive electrode, the negative electrode and the separator, and the positive electrode and the separator are adhered to each other by adhesive polymers that are dispersedly present in the positive electrode and the separator and in a boundary between the positive electrode and the separator. Simultaneously, the negative electrode and the separator are adhered to each other by adhesive polymers that are dispersedly preset in the negative electrode and the separator and in a boundary between the negative electrode and the separator. By this step, water removal contained in the electrode group can be simultaneously performed.

The electrode group can contain a slight amount of solvent.

The drying is preferably performed at 100° C. or less for the following reasons. If the drying temperature exceeds 100° C., the separator may greatly thermally shrink. If this large thermal shrinkage occurs, the separator warps, and this makes it difficult to strongly adhere the positive electrode, negative electrode, and separator. This thermal shrinkage readily occurs when a porous film containing polyethylene or polypropylene is used as a separator. The lower the drying temperature, the more easily this separator thermal shrinkage can be suppressed. However, if the drying temperature is lower than 40° C., the solvent may become difficult to well evaporate. Therefore, the drying temperature is more preferably 40 to 100° C.

(Fourth Step)

After a nonaqueous electrolyte is injected into the electrode group in the jacket, the opening of the jacket is sealed to complete the thin nonaqueous electrolyte secondary battery unit.

As the nonaqueous electrolyte, materials similar to those enumerated in item 4) above in the explanation of the aforementioned first nonaqueous electrolyte secondary battery can be used.

In the above manufacturing method, after the electrode group is housed in the jacket the solution of the adhesive polymer is injected. However, this solution can also be injected before the electrode group is housed in the jacket. If this is the case, the electrode group is formed by interposing the separator between the positive and negative electrodes. This electrode group is impregnated with the solution and dried under vacuum to evaporate the solvent in the solution such that the adhesive polymer is allowed to fill the pores within the positive electrode, the negative electrode and the separator. After this electrode group is housed in the jacket, the nonaqueous electrolyte is injected, and the opening of the jacket is sealed to manufacture the thin nonaqueous electrolyte secondary battery unit. In this case, it is possible to use a metal can as the jacket in place of a film. It is possible to coat the outer circumferential surface of the electrode group with an adhesive before the electrode group is housed in the film jacket so as to allow the electrode group to be adhered to the jacket.

(Fifth Step)

An initial charging is applied to the battery unit thus prepared under temperature of 30° C. to 80° C. and under a charging rate falling within a range of between 0.05 C and 0.5 C. The initial charging under these conditions can be applied for only one cycle or a plurality of cycles. It is also possible to store the battery unit before the initial charging for 1 hour to about 20 hours under the temperature of 30° C. to 80° C. Incidentally, the charging rate "1 C" represents the current value required for charging a nominal capacity (Ah) in an hour.

It is important to set the temperature range appropriately in performing the initial charging. Specifically, if the initial charging temperature is lower than 30° C., the nonaqueous electrolyte has a high viscosity, making it difficult to have the positive electrode, the negative electrode and the separator impregnated uniformly with the nonaqueous electrolyte. As a result, an internal impedance is increased. Also, the utilization of the active material is lowered. On the other hand, if the initial charging temperature exceeds 80° C., the binder contained in the positive and negative electrodes is deteriorated.

Where the charging rate in the initial charging treatment is set to fall within a range of between 0.05 and 0.5 C, the rate of expansion of the positive and negative electrodes caused by the charging car, be retarded appropriately. As a result, the nonaqueous electrolyte is allowed to permeate uniformly into the positive and negative electrodes.

Since the initial charging treatment makes it possible to have the pores of the electrodes and the separator impregnated with the nonaqueous electrolyte uniformly, it is possible to diminish the internal impedance of 1 kHz within the nonaqueous electrolyte secondary battery. Specifically, it is possible to set the product between the battery capacity and the internal impedance of 1 kHz to fall within a range of between 10 mΩ·Ah and 110 mΩ·Ah. As a result, the utilization of the active material can be increased, making it possible to increase the substantial capacity of the battery. It is also possible to improve the charge-discharge cycle characteristics and the large discharge characteristics of the battery.

Description will now be given to a nonaqueous electrolyte secondary battery comprising an electrode group meeting the condition (b) described previously and a nonaqueous solvent containing γ-butyrolactone in an amount larger than 50% by volume and not larger than 95% by volume based on the total amount of the nonaqueous solvent.

In the secondary battery of this type, the positive electrode, the negative electrode and the separator are made integral by the thermal curing of the binder contained in the positive and negative electrodes.

A separator similar to that described previously under the heading "(3) Separator" is used in the secondary battery of this type. Also, a jacket similar to that described previously under the heading "(6) Jacket" is used as a jacket housing the electrode group.

The positive electrode is constructed such that a positive electrode layer containing an active material, a binder and a conducting agent is formed on a single surface or both surfaces of the collector. It is possible to use an active material, a binder, a conducting agent and a collector similar to those described previously under the heading "(1) Positive electrode".

The negative electrode is constructed such that a negative electrode layer containing a carbon material for absorbing desorbing lithium ions and a binder is formed on a single surface or both surfaces of a collector. It is possible to use a carbonaceous material, a binder and a collector similar to those described previously under the heading "(2) Negative Electrode".

The negative electrode layer contains a carbon material capable of absorbing and desorbing lithium ions as described above. Alternatively, it is possible for the negative electrode layer to contain a metal such as aluminum, magnesium, tin or silicon, a metal compound selected from a metal oxide, a metal sulfide and a metal nitride, or a lithium alloy. It is possible to use a metal oxide, a metal sulfide, a metal nitride and a lithium alloy similar to those described previously under the heading "(2) Negative electrode".

The secondary battery of this type can be manufactured by method (II) described in the following.

<Manufacturing Method (II)>

(First Step)

An electrode group is formed by any of methods (a) to (c) below.

(a) Positive and negative electrodes are spirally wound with a separator interposed between them.

(b) Positive and negative electrodes are spirally wound with a separator interposed between them, and the coil is compressed in the direction of diameter.

(c) Positive and negative electrodes are folded twice or more with a separator interposed between them.

(Second Step)

The electrode group is housed in a bag-like film jacket.

(Third Step)

The electrode group is molded while being heated to 40 to 120° C.

This molding is desirably performed such that the electrode group is compressed in the direction of diameter if it is formed by method (a), and is compressed in the direction of stacking if it is formed by method (b) or (c).

The molding can be performed by press molding or forcing into a mold.

The electrode group is heated when it is molded for the reasons explained below. In the electrode group, the separator contains no adhesive polymer. If this electrode group is molded at room temperature, spring back occurs after the molding, i.e., gaps are formed between the positive electrode and the separator and between the negative electrode and the separator. As a result, the contact areas between the positive electrode and the separator and between the negative electrode and the separator are decreased, leading to an increased internal impedance. When the electrode group is molded at 40° C. or higher, the binders contained in the positive and negative electrodes can be thermally set, with the result that the hardness of the electrode group can be increased. Since this suppresses the spring back after the molding, the contact areas between the positive electrode and the separator and between the negative electrode and the separator can be increased. Also, the large contact areas can be maintained even if the charge-discharge cycles are repeated. On the other hand, if the temperature of the electrode group exceeds 120° C., the separator may greatly thermally shrink. The temperature is more preferably 60 to 100° C.

The molding by heating to a specific temperature described above can be performed at normal pressure or reduced pressure or in a vacuum. This heat molding is desirably performed at reduced pressure or in a vacuum because the efficiency of water removal from the electrode group can be improved.

When the molding is performed by press molding, the pressure is preferably set to between 0.01 and 20 kg/cm$^2$ for the following reasons. If the pressure is lower than 0.01 kg/cm$^2$, it is difficult to suppress the spring back amount after the molding step. If the pressure is higher than 20 kg/cm$^2$, however, the porosity of the electrode group tends to be lowered. As a result, the electrode group may fail to retain a sufficiently large amount of the nonaqueous electrolyte.

(Fourth Step)

After a nonaqueous electrolyte is injected into the electrode group in the jacket, the opening of the jacket is sealed to complete the nonaqueous electrolyte secondary battery unit.

In the above manufacturing method, after being housed in the jacket, the electrode group is molded while being heated to a specific temperature. However, this heat molding can also be performed before the electrode group is housed in the jacket. If this, is the case, an electrode group is formed in the first step described earlier and molded while being heated to 40 to 120° C. Then, this electrode group is housed in the jacket. After that, the nonaqueous electrolyte is injected, and the opening of the jacket is sealed to complete the nonaqueous electrolyte secondary battery unit. It is possible to use a metal can as a jacket in place of a film.

(Fifth Step)

An initial charging is applied to the secondary battery unit thus assembled under temperature of 30° C. to 80° C. and under a charging rate falling within a range of between 0.05 C and 0.5 C. The initial charging under these conditions can be applied for only one cycle or a plurality of cycles. It is also possible to store the battery unit before the initial charging for 1 hour to about 20 hours under the temperature of 30° C. to 80° C. The temperature and the charging rate in the initial charging treatment are similar to those described previously.

Since the initial charging treatment makes it possible to have the pores of the electrodes and the separator impregnated with the nonaqueous electrolyte uniformly, it is possible to diminish the internal impedance of 1 kHz within the nonaqueous electrolyte secondary battery. Specifically, it is possible to set the product between the battery capacity and the internal impedance of 1 kHz to fall within a range of between 10 mΩ·Ah and 110 mΩ·Ah. As a result, the utilization of the active material can be increased, making it possible to increase the substantial capacity of the battery. It is also possible to improve the charge-discharge cycle characteristics and the large discharge characteristics of the battery.

In the nonaqueous electrolyte secondary battery according to the first embodiment of the present invention, it is possible to use a metal can such as an aluminum can as a jacket. In this case, a laminate structure consisting of the positive electrode, the negative electrode and the separator is spirally wound and put in the metal can so as to prepare a desired nonaqueous electrolyte secondary battery. In this case, the adhesive layer and the adhesive polymer need not be used.

A nonaqueous electrolyte secondary battery according to a second embodiment of the present invention will now be described.

The secondary battery according to the second embodiment of the present invention comprises:

an electrode group including a positive electrode having a collector and a positive electrode layer supported on a single surface or both surfaces of the collector and containing an active material, a negative electrode having a collector and a negative electrode layer supported on a single surface or both surfaces of the collector and containing a material capable of absorbing and desorbing lithium ions, and a separator interposed between the positive electrode and the negative electrode;

a nonaqueous electrolyte impregnated in the electrode group and containing a nonaqueous solvent and a lithium salt dissolved in the nonaqueous solvent; and a jacket housing the electrode group.

The porosity of the positive electrode layer is lower than that of the negative electrode layer. Also, the thickness of the positive electrode layer should be 10 to 100 μm. Further, the nonaqueous solvent should contain γ-butyrolactone in an amount of 40 to 95% by volume based on the total amount of the nonaqueous solvent.

In the secondary battery of the present invention, it is possible for the positive electrode, the negative electrode and the separator not to be formed as an integral structure. However, it is desirable to form an integral structure under the conditions given in item (a) or (b):

(a) The positive electrode and the separator are adhered to each other by an adhesive polymer present in at least a part of the boundary therebetween, and the negative electrode and the separator are adhered to each other by an adhesive polymer present in at least a part of the boundary therebetween. Particularly, the positive electrode and the separator preferably be adhered to each other by an adhesive polymer dotted inside and at the boundary between the positive electrode and the separator. Also, the negative electrode and the separator preferably be adhered to each other by an adhesive polymer dotted inside and at the boundary between the negative electrode and the separator.

(b) The positive electrode, the negative electrode and the separator are made integral by thermally curing a binder contained in each of the positive electrode and the negative electrode.

The construction in any of items (a) and (b) given above makes it possible to further suppress the swelling of the jacket.

It is desirable for the secondary battery of the present invention to have a product between the battery capacity (Ah) and the battery internal impedance (mΩ) at 1 kHz of not smaller than 10 mΩ·Ah and not larger than 110 mΩ·Ah. Incidentally, the battery capacity denotes a nominal capacity or the discharge capacity at the time when the battery is discharged at a discharge rate of 0.2 C. More preferably, the product between the battery capacity and the battery internal impedance at 1 kHz should fall within a range of between 20 mΩ·Ah and 60 mΩ·Ah.

The product between the battery capacity and the battery internal impedance at 1 kHz can be set to fall within a range of between 10 mΩ·Ah and 110 mΩ·Ah by the "Manufacturing method (I)" or "Manufacturing method (II)" described previously. In the Manufacturing method (I) noted above, the addition amount and distribution of the adhesive polymer and the initial charging conditions are set to permit the product between the battery capacity and the internal impedance should be set to fall within a range of between 10 mΩ·Ah and 110 mΩ·Ah. In the Manufacturing method (II), the temperature and the pressure in the pressing step for forming the electrode group and the initial charging conditions should be set to permit the product between the battery capacity and the internal impedance to fall within a range of between 10 mΩ·Ah and 110 mΩ·Ah.

The nonaqueous electrolyte secondary battery equipped with an electrode group meeting the conditions given in item (a) above will now be described.

1) Positive Electrode

This positive electrode is constructed such that a positive electrode layer containing an active material, a conducting agent, an adhesive polymer and a binder is formed on a single surface or both surfaces of a collector. It is possible to use the active material, the conducting agent, the adhesive polymer and the binder similar to those described previously.

Figure 4:
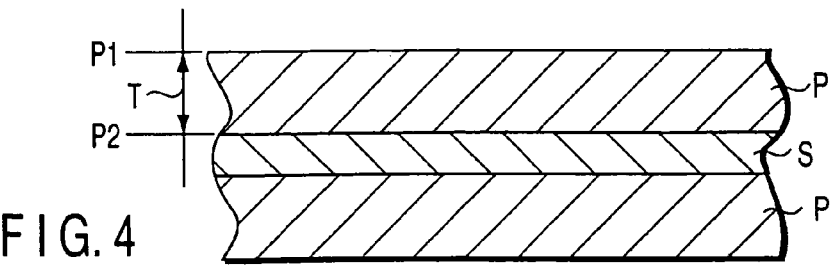
FIG. 4 is a cross sectional view for explaining the thickness of a positive electrode active material layer in a nonaqueous electrolyte secondary battery according to a second embodiment of the present invention.

The thickness of the positive electrode layer should be 10 to 100 µm. The thickness of the positive electrode layer represents a distance between the surface of the positive electrode layer facing the separator and the surface of the positive electrode layer facing the collector, as shown in, for example, FIG. 4. Specifically, where a positive electrode layer P is carried on each surface of a collector S, the thickness T of the positive electrode layer P represents the distance between a surface $P_1$ of the positive electrode layer P facing the separator and a surface $P_2$ of the positive electrode layer P facing the collector S. It follows that, where positive electrode layers are formed on both surfaces of the collector, one positive electrode layer has a thickness of 10 to 100 µm. Naturally, the total thickness of the two positive electrode layers formed on both surfaces of the collector is 20 to 200 µm. If the positive electrode layer is thinner than 10 µm, the weight ratio and the volume ratio of the collector is unduly increased so as to lower the energy density. The lower limit in the thickness is preferably 30 µm, and most preferably 50 µm. On the other hand, if the positive electrode layer is thicker than 100 µm, the nonaqueous electrolyte is concentrated on the surface of the positive electrode at rapid change and at rapid discharge. As a result, the electrode reaction scarcely proceeds inside the positive electrode, leading to a shortened cycle life. The upper limit in the thickness is preferably 85 µm, and most preferably 60 µm. It is more desirable to set the thickness of the positive electrode layer to fall within a range of between 10 µm and 60 µm. Where the thickness falls within this range, the large discharge characteristics and the cycle life can be markedly improved. More preferably, the positive electrode layer should fall within a range of between 30 µm and 50 µm.

For measuring the thickness of the positive electrode, 10 optional points apart from each other by at least 1 cm are selected for actually measuring the thickness at each point, followed by averaging the measured values to determine the thickness of the positive electrode. Where the positive electrode consists of a collector and positive electrode layers formed on both surfaces of the collector, the thickness of the positive electrode is measured after one of the positive electrode layers is removed. Then, the remaining positive electrode layer is removed from the collector for measuring the thickness of the collector. The thickness of the collector is measured at 10 optional points apart from each other by at least 1 cm, and the measured values are averaged to determine the thickness of the collector. Naturally, the difference in thickness between the positive electrode and the collector provides the thickness of the positive electrode layer.

The porosity of the positive electrode layer is lower than that of the negative electrode layer. It is desirable to set the porosity of the positive electrode layer to fall within a range of between 25% and 40%. If the porosity is lower than 25%, the nonaqueous electrolyte tends to fail to permeate uniformly into the positive electrode layer even if the thickness of the particular layer is restricted. On the other hand, if the porosity exceeds 40%, it is difficult to obtain a high capacity, i.e., a high energy density. More preferably, the porosity of the positive electrode layer should fall within a range of between 30% and 35%.

A porous conductive substrate or a non-porous conductive substrate can be used as the collector. It is possible to use, for example, aluminum, stainless steel or nickel for forming the conductive substrate. The thickness of the collector should desirably be set to fall within a range of between 5 and 20 µm. If the thickness falls within the particular range, it is possible to increase the mechanical strength of the positive electrode while suppressing an increase in the weight of the positive electrode.

2) Negative Electrode

The negative electrode is constructed such that a negative electrode layer containing a carbon material capable of absorbing and desorbing lithium ions, an adhesive polymer and a binder is formed on one surface or both surfaces of a collector.

It is possible to use a carbon material capable of absorbing and desorbing lithium ions, a conducting agent, an adhesive polymer and a binder similar to those described previously.

It is desirable for the negative electrode layer to have a thickness of 10 to 100 µm. The thickness represents the distance between the surface of the negative electrode layer facing the separator and the surface of the negative electrode layer facing the collector. Where negative electrode layers are formed on both surfaces of the collector, one negative electrode layer has a thickness of 10 to 100 µm. Naturally, the total thickness of the two negative electrode layers formed on both surfaces of the collector is 20 to 200 µm. If the negative electrode layer is thinner than 10 µm, the weight ratio and the volume ratio of the collector are increased, making it difficult to increase sufficiently the energy density. The lower limit in the thickness is preferably 30 µm, and most preferably 50 µm. On the other hand, if the thickness of the negative electrode layer exceeds 100 µm, the nonaqueous electrolyte tends to be concentrated on the surface of negative electrode, making it difficult to improve sufficiently the cycle life of the secondary battery. The upper limit in the thickness is preferably 85 µm, and most preferably 60 µm. More preferably, the thickness of the negative electrode layer should be set to fall within a range of between 10 and 60 µm. Where the thickness falls within the particular range, the large discharge characteristics and the cycle life can be markedly improved. Most preferably, the negative electrode layer should fall within a range of between 30 and 50 µm.

For measuring the thickness of the negative electrode, 10 optional points apart from each other by at least 1 cm are selected for actually measuring the thickness at each point, followed by averaging the measured values to determine the thickness of the negative electrode. Where the negative electrode consists of a collector and negative electrode layers formed on both surfaces of the collector, the thickness of the negative electrode is measured after one of the negative electrode layers is removed. Then, the remaining negative electrode layer is removed from the collector for measuring the thickness of the collector. The thickness of the collector is measured at 10 optional points apart from each other by at least 1 cm, and the measured values are averaged to determine the thickness of the collector. Naturally, the difference in thickness between the negative electrode and the collector provides the thickness of the negative electrode layer.

It is desirable to set the porosity of the negative electrode layer to fall within a range of between 35% and 50%. If the porosity is lower than 35%, the nonaqueous electrolyte fails to be distributed uniformly, resulting in possibility of precipitating lithium dendrite. On the other hand, if the porosity exceeds 50%, it is difficult to obtain a high battery capacity, i.e., a high energy density. More preferably, the porosity should fall within a range of between 35% and 45%.

The carbon material should be mixed in an amount of 90 to 98% by weight. Also, the binder should be mixed in an amount of 2 to 20% by weight. Particularly, it is desirable for the carbon material to be contained in an amount of 10 to 70 $g/cm^2$ on one surface in the prepared negative electrode.

The density of the negative electrode layer should desirably fall within a range of between 1.20 and 1.50 g/cm³.

As the collector, a porous conductive substrate or a conductive substrate having no pores can be used. These conductive substrates can be made from, for example, copper, stainless steel, or nickel. The thickness of the collector should desirably fall within a range of between 5 and 20 μm. If the thickness falls within the particular range, it is possible to ensure a sufficiently high mechanical strength of the negative electrode while properly suppressing the weight of the negative electrode.

The negative electrode layer contains a carbon material capable of absorbing-desorbing lithium ions as described previously. In addition, it is possible for the negative electrode layer to contain metals such as aluminum, magnesium, tin, and silicon, a metal compound selected from the group consisting of a metal oxide, a metal sulfide, and a metal nitride, and a lithium alloy. It is possible to use a metal oxide, a metal sulfide, a metal nitride and a lithium alloy similar to those described previously in conjunction with the nonaqueous electrolyte secondary battery according to the first embodiment of the present invention.

3) Separator

This separator is formed of a porous sheet. It is possible to use a porous sheet similar to that described previously in conjunction with the nonaqueous electrolyte secondary battery according to the first embodiment of the present invention.

4) Nonaqueous Electrolyte

The nonaqueous electrolyte used in the present invention is prepared by dissolving a lithium salt in a mixed nonaqueous solvent containing γ-butyrolactone (BL) in an amount of 40 to 95% by volume based on the total amount of the nonaqueous solvent. It is desirable for the mixed nonaqueous solvent to contain the largest amount of BL. If the BL amount is smaller than 40% by volume, a gas is likely to be generated under high temperatures even if the thickness of the positive electrode layer is defined. Also, where the nonaqueous solvent contains a cyclic carbonate together with BL, the viscosity of the solvent is markedly increased because the ratio of the cyclic carbonate is relatively high. As a result, the electrical conductivity and the permeability of the nonaqueous electrolyte are markedly lowered. It follows that the charge-discharge cycle characteristics, the large discharge characteristics, and the discharge characteristics under low temperatures about −20° C. are lowered, even if the thickness of the positive electrode layer is defined. On the other hand if the BL amount exceeds 95% by volume, a reaction takes place between the negative electrode and BL so as to impair the charge-discharge characteristics. To be more specific, if the negative electrode containing, e.g., a carbon material capable of absorbing and desorbing lithium ions, is reacted with BL to bring about a reducing decomposition of the nonaqueous electrolyte, a film inhibiting the charge-discharge reaction is formed on the surface of the negative electrode. As a result, a current concentration tends to take place in the negative electrode so as to bring about undesirable phenomena. For example, lithium metal is precipitated on the surface of the negative electrode. Alternatively, an impedance is increased at the interface of the negative electrode so as to lower the charge-discharge efficiency of the negative electrode and to impair the charge-discharge cycle characteristics. Preferably, the BL content of the nonaqueous solvent should fall within a range of between 60% and 90% by volume. Where the BL content of the nonaqueous solvent falls within the range specified in the present invention, the gas generation during storage of the secondary battery under high temperatures can be suppressed more effectively. Also, it is possible to further improve the discharge capacity under low temperatures about −20° C. More preferably, the BL content of the nonaqueous solvent should fall within a range of between 75% by volume and 90% by volume.

It is desirable to use a cyclic carbonate together with BL in the present invention because the cyclic carbonate permits improving the charge-discharge efficiency.

The cyclic carbonate used in the present invention includes, for example, propylene carbonate (PC), ethylene carbonate (EC), vinylene carbonate (VC), and trifluoropropylene carbonate (TFPC). Particularly, if EC is used together with BL, the charge-discharge characteristics and the large discharge characteristics can be markedly improved. It is also desirable to prepare a mixed solvent by mixing BL with at least one kind of a third solvent selected from the group consisting of PC, VC, TFPC, diethyl carbonate (DEC), methyl ethyl carbonate (MEC) and an aromatic compound. The mixed solvent of the particular construction permits improving the charge-discharge cycle characteristics.

In order to decrease the viscosity of the mixed solvent, it is possible for the nonaqueous solvent containing BL to further contain 20% by volume or less of a solvent having a low viscosity selected from the group consisting of, for example, a chain carbonate, a chain ether, and a cyclic ether.

Preferred combinations of the nonaqueous solvents used in the present invention include, for example, a combination of BL and EC, a combination of BL and PC, a combination of BL, EC and DEC, a combination of BL, EC and MEC, a combination of BL, EC, MEC and VC, a combination of BL, EC and VC, a combination of BL, PC and VC, and a combination of BL, EC, PC and VC. In this case, it is desirable to set the mixing ratio of EC to fall within a range of between 5 and 40% by volume. It should be noted in this connection that, if the mixing amount of EC is smaller than 5% by volume, it is difficult to cover densely the surface of the negative electrode with a protective film, giving rise to a possibility that a reaction may take place between the negative electrode and BL. As a result, it is difficult to improve sufficiently the charge-discharge cycle characteristics. On the other hand, if the mixing amount of EC exceeds 40% by volume, the viscosity of the nonaqueous electrolyte is unduly increased so as to lower the ionic conductance. As a result, it is difficult to improve sufficiently the charge-discharge cycle characteristics, the large discharge characteristics and the low temperature discharge characteristics. More preferably, the EC amount should fall within a range of between 10 and 35% by volume. Also, the solvent consisting of at least one compound selected from the group consisting of DEC, MEC, PC and VC serves to forms a dense protective film on the surface of the negative electrode so as to lower the impedance at the interface of the negative electrode. The addition amount of any of these solvents is not particularly limited as far as it is possible to obtain the particular function described above. It should be noted, however, that, if the amount of at least one-solvent selected from the group consisting of DEC, MEC, PC and VC exceeds 10% by volume, the viscosity of the nonaqueous electrolyte tends to be increased so as to lower the ionic conductance. Therefore, it is desirable to use at least one solvent selected from the group consisting of DEC, MEC, PC and VC in an amount not exceeding 10% by volume. More preferably, at least one of these solvents should be used in an amount of 2% by volume or less. On the other hand, the lower limit in the addition amount of at least one of these solvents should be 0.001% by volume, preferably, 0.05% by volume.

Particularly, it is desirable for the nonaqueous solvent to contain 40 to 95% by volume of BL, EC and VC. The nonaqueous electrolyte secondary battery comprising a nonaqueous electrolyte containing the nonaqueous solvent noted above and a negative electrode containing a carbon material capable of absorbing-desorbing lithium ions permits markedly lowering the impedance at the interface of the negative electrode and also permits suppressing the metal lithium precipitation on the negative electrode so as to improve the charge-discharge efficiency of the negative electrode. As a result, it is possible to suppress the gas generation during storage of the secondary battery under high temperatures, thereby preventing a jacket having a thickness of 3 mm or less from being deformed while realizing an excellent large discharge characteristics and a long life. It is considered reasonable to understand that the reasons for such a prominent improvement of the negative electrode characteristics are as follows. Specifically, in the secondary battery, a protective film consisting of EC is formed on the surface of the negative electrode, and a thin and dense film consisting of VC is further formed on the surface of the negative electrode. It is considered reasonable to understand that the reaction between BL and the negative electrode is inhibited, thereby lowering the impedance and preventing the metal lithium precipitation.

It is possible to use a nonaqueous solvent containing 40 to 95% by volume of BL, EC and an aromatic compound in place of the mixed nonaqueous solvent of the composition described previously. The aromatic compound is at least one compound selected from the group consisting of benzene, toluene, xylene, biphenyl and terphenyl. EC is deposited on the surface of the negative electrode containing, for example, a carbon material capable of absorbing-desorbing lithium ions so as to form a protective film, thereby suppressing the reaction between the negative electrode and BL. In this case, it is desirable for the mixed nonaqueous solvent to contain 5 to 40% by volume of EC for the reasons described previously. Preferably, the EC content should fall within a range of between 10% by volume and 35% by volume. On the other hand, the benzene ring of the aromatic compound tends to be adsorbed easily on the surface of the negative electrode containing, for example, a carbon material capable of absorbing-desorbing lithium ions so as to suppress the reaction between BL and the negative electrode. As described above, the nonaqueous electrolyte based on a mixed nonaqueous solvent containing 40 to 95% by volume of BL, EC and an aromatic compound makes it possible to suppress sufficiently the reaction between the negative electrode and BL so as to improve the charge-discharge cycle characteristics of the secondary battery. It is desirable for the mixed nonaqueous solvent to further contain at least one solvent selected from the group consisting of DEC, MEC, PC, TFPC and VC. By adding at least one solvent selected from the group consisting of DEC, MEC, PC, TFPC and VC, the reaction between the negative electrode and BL can be suppressed more effectively, leading to a further improvement in the charge-discharge cycle characteristics. Particularly, it is desirable to use VC as an additional solvent. The addition amount of a third solvent consisting of at least one compound selected from the group consisting of an aromatic compound, DEC, MEC, PC, TFPC and VC is not particularly limited. In other words, the addition amount can be determined appropriately as far as the particular function described above can be performed. It should be noted, however, that, if the mixing ratio of the third solvent exceeds 10% by volume, it is difficult to suppress sufficiently the decomposition of the nonaqueous electrolyte by oxidation under high temperatures. Alternatively, the viscosity of the nonaqueous electrolyte tends to be increased so as to lower the ionic conductance. Naturally, it is desirable for the volume ratio of the third solvent in the nonaqueous solvent to be at most 10% by volume. Preferably, the volume ratio of the third solvent should be at most 2% by volume. On the other hand, the lower limit of the volume ratio of the third component should be 0.001% by volume, preferably 0.05% by volume.

It is possible to use an electrolytic salt, which is contained in the nonaqueous electrolyte, similar to that described previously in conjunction with the nonaqueous electrolyte secondary battery according to the first embodiment of the present invention. Particularly, it is desirable to use $LiPF_6$ or $LiBF_4$.

The amount of the electrolytic salt dissolved in the nonaqueous solvent should desirably be 0.5 to 2.0 mol/l (liter).

It is possible to add 0.1 to 1% of a surfactant such as trioctyl phosphate to the nonaqueous electrolyte in order to improve the wettability of the nonaqueous electrolyte with the separator.

It is desirable to set the amount of the nonaqueous electrolyte to fall within a range of between 0.2 g and 0.6 g per 100 mAh of the battery unit capacity for the reasons described previously in conjunction with the nonaqueous electrolyte secondary battery according to the first embodiment of the present invention. More preferably, the amount of the nonaqueous electrolyte should fall within a range of between 0.4 g/100 mAh and 0.55 g/100 mAh.

5) Adhesive Polymer

It is desirable for the adhesive polymer to be capable of maintaining a high adhesivity while holding the nonaqueous electrolyte. Further, the adhesive polymer should desirably exhibit a high lithium ionic conductance. To be more specific, it is possible to use adhesive polymers similar to those described previously in conjunction with nonaqueous electrolyte secondary battery according to the first embodiment of the present invention. Particularly, it is desirable to use polyvinylidene fluoride as the adhesive polymer.

It is desirable for the adhesive polymer to assume a porous structure having fine pores within the cavities of the positive electrode, the negative electrode, and the separator. The adhesive polymer assuming a porous structure is capable of holding a nonaqueous electrolyte.

The total amount of the adhesive polymer contained in the secondary battery should desirably fall within a range of between 0.1 mg/100 mAh and 6 mg/100 mAh of the battery capacity. More preferably, the total amount of the adhesive polymer should be 0.2 to 1 mg/100 mAh of the battery capacity.

6) Jacket

A first jacket made of a sheet having a thickness of 0.5 mm or less including a resin layer or a second jacket having a thickness of 0.3 mm or less is used in the preset invention. The first and second jackets are as already described in conjunction with the first nonaqueous electrolyte secondary battery.

When the film jacket is used, the electrode group is desirably adhered to the inner surface of the jacket by an adhesive layer formed on at least a portion of the surface of the electrode group. With this arrangement, the jacket can be fixed to the surface of the electrode group. So, it is possible to prevent the nonaqueous electrolyte from permeating into the boundary between the electrode group and the jacket.

Figure 6:
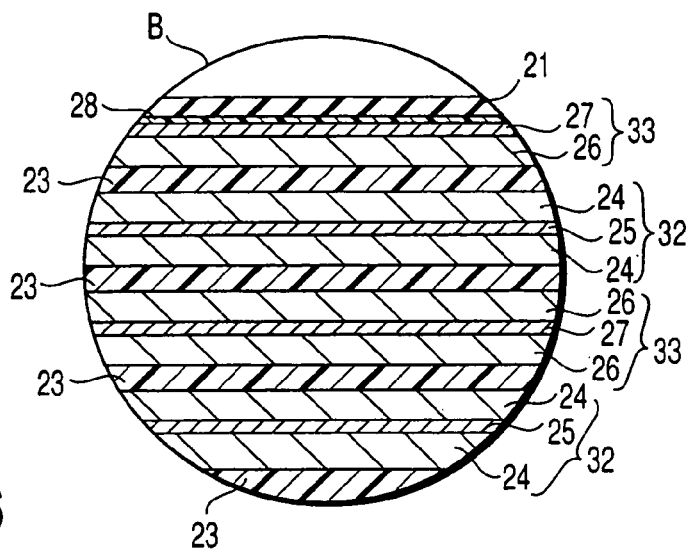
FIG. 6 is a cross sectional view showing in a magnified fashion a portion B shown in FIG. 5.
Figure 7:
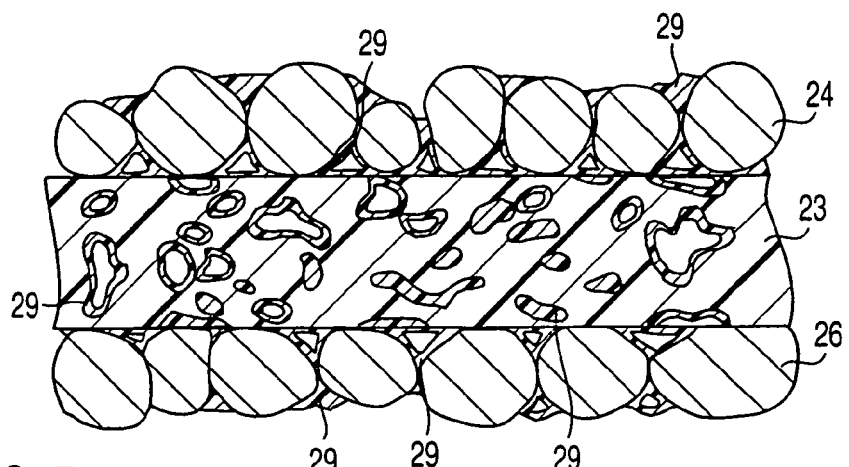
FIG. 7 schematically shows the boundary regions between the positive electrode and the separator and between the separator and the negative electrode in the secondary battery shown in FIG. 5.

A thin lithium ion secondary battery as an example of the nonaqueous electrolyte secondary battery according to the present invention will now be described below with reference to FIGS. 5 to 7.

Figure 5:
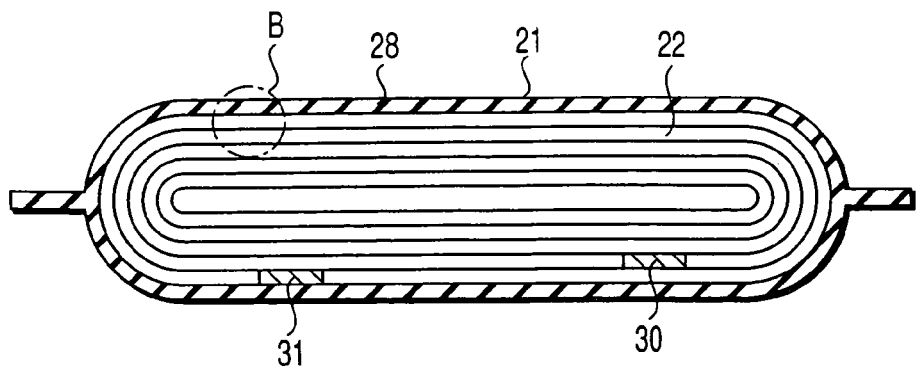
FIG. 5 is a cross sectional view exemplifying a nonaqueous electrolyte secondary battery according to a second embodiment of the present invention.

FIG. 5 is a sectional view showing this example of the first nonaqueous electrolyte secondary battery according to the second embodiment of the present invention. FIG. 6 is an enlarged sectional view showing a portion B in FIG. 5. Further, FIG. 7 is a schematic view showing the boundaries and their vicinities of a positive electrode, separator, and negative electrode in the secondary battery shown in FIG. 5.

As shown in FIG. 5, a jacket 21 made of, for example, a film surrounds an electrode group 22. This electrode group 22 has a structure formed by spirally winding a stack including a positive electrode, negative electrode, and separator, and compression-molding the coil in the direction of diameter. As shown in FIG. 6, the stack is formed by stacking a separator 23; a positive electrode 32 including a positive electrode layer 24, a positive electrode collector 25, and a positive electrode layer 24; a separator 23; a negative electrode 33 including a negative electrode layer 26, a negative electrode collector 27, and a negative electrode layer 26; a separator 23; a positive electrode 32 including a positive electrode layer 24, a positive electrode collector 25, and a positive electrode layer 24; a separator 23; and a negative electrode 33 including a negative electrode layer 26, and a negative electrode collector 27 in this order as seen from the lower side in the drawing. The negative electrode collector 27 is the outermost layer of the electrode group 22. An adhesive layer 28 is present on the surface of the electrode group 22. The adhesive layer 28 is adhered to the inner surface of the jacket 21. As shown in FIG. 7, in voids of the positive electrode layer 24, the separator 23, and the negative electrode layer 26, an adhesive polymer 29 is held, respectively. The positive electrode 32 and the separator 23 are adhered to each other by adhesive polymers 29 that are dispersedly present in the positive electrode layer 24 and the separator 23 and in a boundary between the positive electrode layer 24 and the separator 23. The negative electrode 33 and the separator 23 are adhered to each other by adhesive polymers 29 that are dispersedly present in the negative electrode layer 26 and the separator 23 and in a boundary between the negative electrode layer 26 and the separator 23. The electrode group 22 in the jacket 21 is impregnated with a nonaqueous electrolyte. A band-like positive electrode lead 30 has one end connected to the positive electrode collector 25 of the electrode group 22 and the other end extending from the jacket 21. A band-like negative electrode lead 31 has one end connected to the negative electrode collector 27 of the electrode group 22 and the other end extending from the jacket 21.

Incidentally, in the construction shown in FIG. 5, the adhesive layer 28 is formed on the entire surface of the electrode group 22. However, it is also possible to form the adhesive layer 28 in a part of the electrode group 22. Where the adhesive layer 28 is formed in a part of the electrode group 22, it is desirable to form the adhesive layer 28 on at least a plane corresponding to the outermost circumferential surface of the electrode group 22. Also, it is possible to omit the adhesive layer 28.

The nonaqueous electrolyte secondary battery provided with an electrode group satisfying the condition of item (a) described previously can be manufactured by, for example, the manufacturing method (I) described previously in conjunction with the nonaqueous electrolyte secondary battery according to the first embodiment of the present invention. To reiterate, the secondary battery can be manufactured by the method comprising the step of preparing an electrode group by interposing a porous sheet used as a separator between the positive electrode and the negative electrode, the step of impregnating the electrode group with a solution prepared by dissolving an adhesive polymer in a solvent, the step of applying a vacuum drying to the electrode group, the step of impregnating the electrode group with a nonaqueous electrolyte, followed by sealing the electrode group within the jacket so as to assemble a thin nonaqueous electrolyte secondary battery unit, and the step of applying an initial charging at a charging rate of 0.05 C to 0.5 C under a temperature of 30° C. to 80° C. Of course, the manufacturing method of the nonaqueous electrolyte secondary battery of the present invention is not limited to the method described above, as far as the battery falls within the technical scope of the present invention.

A nonaqueous electrolyte secondary battery provided with the electrode group meeting the condition given in item (b) previously and with a nonaqueous electrolyte including a nonaqueous solvent containing 40 to 95% by volume of γ-butyrolactone will now be described.

In this secondary battery, the positive electrode, the negative electrode and the separator are made integral by thermal curing of the binder contained in the positive and negative electrodes.

It is possible to use a separator similar to that described previously under the heading "3) Separator" in conjunction with the nonaqueous electrolyte secondary battery according to the second embodiment of the present invention. On the other hand, it is to use a jacket housing the electrode group similar to that described previously under the heading "6) Jacket" in conjunction with the nonaqueous electrolyte secondary battery according to the second embodiment of the present invention.

The positive electrode is constructed such that a positive electrode layer containing an active material, a binder and a conducting agent is held on one surface or both surface of the collector. At is possible to use the active material, the binder, conducting agent and the collector similar to those described previously under the heading "1) Positive electrode" in conjunction with the nonaqueous electrolyte secondary battery according to the second embodiment of the present invention.

The thickness of the positive electrode layer should be 10 to 100 μm for the reasons described previously. Where the positive electrode layer is held on both surfaces of the collector, the total thickness of two positive electrode layers should fall within a range of between 20 μm and 200 μm. The lower limit in the thickness is preferably 30 μm, and most preferably 50 μm. On the other hand, the upper limit in the thickness is preferably 85 μm, and most preferably 60 μm. Preferably, the thickness of the positive electrode layer should be 10 to 60 μm for the reasons described previously in conjunction with the nonaqueous electrolyte secondary battery according to the second embodiment of the present invention. More preferably, the positive electrode layer should fall within a range of between 30 μm and 50 μm.

The porosity of the positive electrode layer should be lower than that of the negative electrode layer. The porosity of the positive electrode layer should be set to fall within a range of 25% to 40%, more preferably between 30% and 35%.

The negative electrode is constructed such that a negative electrode layer containing a carbon material capable of absorbing and desorbing lithium ions and a binder is held on one surface or both surfaces of a collector. It is to use the carbon material, the binder and the collector similar to those described previously under the heading "2) Negative electrode" in conjunction with the nonaqueous electrolyte secondary battery according to the second embodiment of the present invention.

The thickness of the negative electrode layer should be 10 to 100 μm for the reasons described previously. Where the negative electrode material layer is held on both surfaces of the collector, the total thickness of two negative electrode layers should fall within a range of between 20 μm and 200 μm. The lower limit in the thickness is preferably 30 μm, and most preferably 50 μm. On the other hand, the upper limit in the thickness is preferably 85 μm, and most preferably 60 μm. Preferably, the thickness of the negative electrode layer should be 10 to 60 μm for the reasons described previously in conjunction with the nonaqueous electrolyte secondary battery according to the second embodiment of the present invention. Most preferably, the negative electrode layer should fall within a range of between 30 μm and 50 μm.

The porosity of the negative electrode active material should desirably be 35% to 50% for the reasons described previously. More preferably, the porosity of the negative electrode active material should desirably be 35% to 45%.

It is desirable to mix the carbon material in an amount of 90 to 98% by weight and the binder in an amount of 2 to 20% by weight. Particularly, the amount of the carbon material should desirably be 10 to 70 g/cm$^2$. On the other hand, it is desirable to set the density of the negative electrode layer to fall within a range of between 1.20 to 1.50 g/cm$^3$.

The secondary battery can be manufactured by the method described previously under the heading "Manufacturing method (II)" in conjunction with the nonaqueous electrolyte secondary battery according to the second embodiment of the present invention. To reiterate, the secondary battery can be manufactured by the method comprising the step of preparing an electrode group by interposing a separator between a positive electrode and a negative electrode, the step of molding the electrode group while heating the electrode group to 40 to 120° C., the step of impregnating the electrode group with a nonaqueous electrolyte, followed by sealing the electrode group within the jacket so as to assemble a nonaqueous electrolyte secondary battery (battery unit), and the step of applying an initial charging treatment to the battery unit at a charging rate of 0.05 to 0.5 C under temperature of 30° C. to 80° C.

Incidentally, in the nonaqueous electrolyte secondary battery according to the second embodiment of the present invention, it is possible to use, for example, an aluminum can as a jacket and to house the electrode group consisting of a positive electrode, a negative electrode and a separator within the aluminum can. In this case, it is unnecessary to use an adhesive layer or an adhesive polymer.

As described above in detail, the nonaqueous electrolyte secondary battery according to the present invention comprises an electrode group including a positive electrode, a negative electrode containing a material capable of absorbing and desorbing lithium ions, and a separator interposed between the positive and negative electrodes, a nonaqueous electrolyte impregnated in the electrode group and prepared by dissolving a lithium salt in a nonaqueous solvent, and a jacket for housing the electrode group, said jacket having a thickness of 0.3 mm or less. It should be noted that the nonaqueous solvent used in the present invention should contain γ-butyrolactone in an amount larger than 50% by volume and not larger than 95% by volume based on the total amount of the nonaqueous solvent.

In a nonaqueous electrolyte secondary battery, the thickness of the secondary battery is required to be as small as 3 to 4 mm. It is undesirable to decrease the thickness of the electrode group in an attempt to decrease the thickness of the secondary battery because the battery capacity is lowered if the electrode group is made unduly thin. In order to make the secondary battery sufficiently thin without impairing the battery capacity, it is necessary to decrease the thickness of the jacket. However, if the thickness of the jacket is not larger than 0.3 mm, the jacket is deformed by the gas generated during storage of the secondary battery under high temperatures. Under the circumstances, it was difficult in the past to use a jacket having less than 0.3 mm of thickness and, thus, it was unavoidable to sacrifice the battery capacity in making the secondary battery sufficiently thin.

It should be noted that γ-butyrolactone is excellent in its chemical stability. Therefore, a nonaqueous solvent containing a predetermined amount of γ-butyrolactone serves to suppress the reaction between the positive electrode active material and the nonaqueous electrolyte when the secondary battery is stored under high temperatures, with the result that the decomposition of the nonaqueous electrolyte by oxidation is suppressed. It follows that the amount of the generated gas can be suppressed to a low level, making it possible to prevent the thin jacket having a thickness of 0.3 mm or less from being swollen. Therefore, it is possible to decrease the thickness of the secondary battery while maintaining a practical large discharge characteristics and charge-discharge cycle characteristics and while scarcely sacrificing the battery capacity. It follows that it is possible to obtain a thin nonaqueous electrolyte secondary battery excellent in the large discharge characteristics, having a long life, and high in both the weight energy density and the volume energy density.

It is possible to prevent the reaction between the negative electrode and γ-butyrolactone so as to suppress decomposition of the nonaqueous electrolyte by reduction by setting the charging temperature at 30 to 80° C. and the charging rate at 0.05 to 0.5 C in applying an initial charging to the secondary battery. As a result, the impedance at the interface of the negative electrode can be lowered and the metal lithium precipitation can be suppressed. It follows that it is possible to improve the large discharge characteristics and the charge-discharge cycle characteristics of the secondary battery.

In the secondary battery of the present invention, the concentration of the lithium salt contained in the nonaqueous electrolyte is set at 0.5 mol/l or more so as to improve the ionic conductance of the nonaqueous electrolyte. Therefore, the large discharge characteristics and the cycle life can be further improved.

In the secondary battery of the present invention, a carbon material capable of absorbing and desorbing lithium ions preferably be contained in the negative electrode. This case, if the nonaqueous solvent further contains ethylene carbonate, a protective film is formed on the surface of the negative electrode. This makes it also possible to further suppress the reaction between γ-butyrolactone and the negative electrode so as to improve the large discharge characteristics and the cycle life. It is possible to allow the nonaqueous solvent to contain at least one third solvent selected from the group consisting of vinylene carbonate, propylene carbonate, diethyl carbonate, methyl ethyl carbonate, trifluoropropylene and an aromatic compound. In this case, the surface of the negative electrode is densely covered with a protective film so as to markedly suppress the reaction between the negative electrode and γ-butyrolactone. As a result, the large discharge characteristics and the cycle life can be further improved.

In the secondary battery of the present invention, the product between the cell capacity (Ah) and the internal impedance (mΩ) of the battery at 1 kHz is set to fall within a range of between 10 mAh and 110 mAh, making it possible to further improve the large discharge characteristics and the cycle life.

In the secondary battery of the present invention, the separator contains a porous sheet having an air permeability of 600 sec/100 cm$^3$ or less. Use of the particular separator makes it possible to allow the nonaqueous electrolyte containing γ-butyrolactone to permeate uniformly into the separator. As a result, the ionic conductance of the separator can be improved so as to improve the large discharge characteristics and the cycle life.

It should be noted that the jacket having a thickness of 0.3 mm or less, which is included in the secondary battery of the present invention, tends to follow the expansion and shrinkage of the electrode group accompanying the charging and discharging operations. As a result, the jacket fails to hold the electrode group strongly. Therefore, with progress in the charge-discharge cycle, the contact areas between the positive electrode and the separator and between the negative electrode and the separator tend to be diminished. Such being the situation, an adhesive polymer is used in at least a part of the boundaries between the positive electrode and the separator and between the negative electrode and the separator. In this case, the positive electrode, the negative electrode and the separator can be held together by the adhesive polymer in spite of the progress in the charge-discharge cycle. As a result, it is possible to suppress elevation of the battery internal impedance so as to further improve the cycle life. At the same time, the gas generation can be further suppressed during storage of the secondary battery under high temperatures.

In the secondary battery of the present invention, an adhesive polymer is dotted inside the positive electrode and the separator and at the interface between the positive electrode and the separator to allow these positive electrode and the separator to form an integral structure. Likewise, an adhesive polymer is dotted inside the negative electrode and the separator and at the interface between the negative electrode and the separator to allow these negative electrode and the separator to form an integral structure. It follows that it is possible to improve the bonding strength between the positive electrode and the separator and the bonding strength between the negative electrode and the separator while suppressing the internal resistance at a low level. As a result, elevation of the internal impedance can be suppressed so as to improve the cycle life. At the same time, the gas generation can be suppressed more effectively during storage of the secondary battery under high temperatures.

In the secondary battery of the present invention, the positive electrode, the negative electrode and the separator can be allowed to have an integral structure by the thermal curing of the binder contained in the positive and negative electrodes, making it possible to increase the contact areas between the positive electrode and the separator and between the negative electrode and the separator. In addition, the large contact areas can be maintained even if the charge-discharge cycles are repeated. As a result, elevation of the internal impedance can be suppressed so as to further improve the cycle life. At the same time, the gas generation can be suppressed during storage of the secondary battery under high temperatures.

The present invention also provides a method of manufacturing a nonaqueous electrolyte secondary battery, comprising an electrode group including a positive electrode, a negative electrode containing a material capable of absorbing and desorbing lithium ions, and a separator interposed between the positive electrode and the negative electrode, and a nonaqueous electrolyte impregnated in the electrode group and including a nonaqueous solvent and a lithium salt dissolved in the nonaqueous solvent. The manufacturing method of the present invention is featured in that the nonaqueous solvent contains 55 to 95% by volume of γ-butyrolactone based on the total amount of the nonaqueous solvent, and an initial charging is performed at a charging rate of 0.05 to 0.5 C under temperatures of 30° C. and 80° C.

According to the method of the present invention for manufacturing a nonaqueous electrolyte secondary battery, it is possible to permit the nonaqueous electrolyte to permeate sufficiently into the positive and negative electrodes and the separator. As a result, the internal impedance of the secondary battery can be diminished, and the utilization of the active material can be increased. It follows that the substantial battery capacity can be improved.

The nonaqueous electrolyte secondary battery of the present invention comprises an electrode group including a positive electrode, a negative electrode containing a material capable of absorbing-desorbing lithium ions, and a separator interposed between the positive electrode and the negative electrode; a nonaqueous electrolyte impregnated in the electrode group and comprising a nonaqueous solvent and a lithium salt dissolved in the nonaqueous solvent; and a jacket housing the electrode group and consisting of a sheet having a thickness of 0.5 mm or less including a resin layer. The nonaqueous solvent contains γ-butyrolactone in an amount larger than 50% by volume and not larger than 95% by volume of the entire nonaqueous solvent.

The secondary battery of the particular construction permits suppressing the gas generation and, thus, prevents the jacket consisting of a sheet having a thickness of 0.5 mm or less including a resin layer from being swollen. It follows that it is possible to use a jacket light in weight. In addition, it is possible to maintain large discharge characteristics and charge-discharge cycle characteristics sufficiently satisfactory for the practical use of the battery. It follows that the present invention provides a nonaqueous electrolyte secondary battery excellent in large discharge characteristics, having a long life, and exhibiting a high weight energy density.

The nonaqueous electrolyte secondary battery according to the present invention comprises an electrode group including a collector and a positive electrode layer containing an active material and formed on one surface or both surfaces of the collector, a negative electrode including a collector and a negative electrode layer containing a material capable of absorbing and desorbing lithium ions and formed on one surface or both surfaces of the collector, and a separator interposed between the positive electrode and the negative electrode, a nonaqueous electrolyte including a nonaqueous solvent and a lithium salt dissolved in the nonaqueous solvent, and a jacket having a thickness of 0.3 mm or less and housing the electrode group. The porosity of the positive electrode layer is lower than that of the negative electrode layer. Also, the thickness of the positive electrode layer is 10 to 100 μm. Further, the nonaqueous solvent contains 40 to 95% by volume of γ-butyrolactone based on the total amount of the nonaqueous solvent.

If the nonaqueous electrolyte impregnated in the negative electrode is not distributed uniformly in the nonaqueous electrolyte secondary battery, current concentration takes place in the negative electrode so as to cause precipitation of lithium dendrite. To avoid this difficulty, the porosity is set high in the negative electrode so as to improve the permeability of the nonaqueous electrolyte. On the other hand, such a problem does not take place in the positive electrode. In addition, if the porosity of the positive electrode is set at a high level as in the negative electrode, the density of the positive electrode active material layer is lowered, resulting in failure to obtain a high battery capacity. Such being the situation, the porosity of the positive electrode layer is set lower than that of the negative electrode layer.

A nonaqueous electrolyte containing γ-butyrolactone tends to fail to be permeated uniformly into the electrode such as the positive electrode or the negative electrode. If it is intended to allow the nonaqueous electrolyte to permeate into the positive electrode having a low porosity, the nonaqueous electrolyte permeates into only the surface region of the electrode, leading to a marked shortening of the cycle life.

The permeability of the electrolyte into the positive electrode layer can be improved by setting the thickness of the positive electrode layer having a low porosity at 10 to 100 μm as in the present invention. As a result, the nonaqueous electrolyte containing γ-butyrolactone can be permeated uniformly both into the positive electrode layer and the negative electrode layer. As a result, γ-butyrolactone is enabled to exhibit its excellent resistance to oxidation. The improved permeability makes it possible for the nonaqueous solvent to contain a broaden range of BL, i.e., 40 to 95% by volume of γ-butyrolactone, while allowing the nonaqueous electrolyte containing the particular nonaqueous solvent to serve to suppress the gas generation during storage of the secondary battery under high temperatures. As a result, it is possible to prevent the thin jacket having a thickness of 0.3 mm or less from being swollen. Therefore, it is possible to decrease the thickness of the secondary battery while maintaining a practical large discharge characteristics and charge-discharge cycle characteristics and while scarcely sacrificing the battery capacity. It follows that it is possible to obtain a thin nonaqueous electrolyte secondary battery excellent in the large discharge characteristics, having a long life, and high in both the weight energy density and the volume energy density.

It is possible to prevent the reaction between the negative electrode and γ-butyrolactone so as to suppress decomposition of the nonaqueous electrolyte by reduction by setting the charging temperature at 30 to 80° C. and the charging rate at 0.05 to 0.5 C in applying an initial charging to the secondary battery. As a result, the impedance at the interface of the negative electrode can be lowered and the metal lithium precipitation can be suppressed. It follows that it is possible to improve the large discharge characteristics and the charge-discharge cycle characteristics of the secondary battery.

In the secondary battery of the present invention, the thickness of the negative electrode layer is set at 10 to 100 μm so as to improve the electrolyte permeability into the negative electrode layer. Therefore, it is possible to suppress the gas generation during storage of the secondary battery under high temperatures and to improve the large discharge characteristics and the charge-discharge cycle life.

In the secondary battery of the present invention, the concentration of the lithium salt in the nonaqueous electrolyte is set at 0.5 mol/l or more so as to improve the ionic conductance of the nonaqueous electrolyte and, thus, to improve the large discharge characteristics and the cycle life.

In the secondary battery of the present invention, the negative electrode preferably contain a carbon material capable of absorbing and desorbing lithium ions. In this case, if the nonaqueous solvent further contains ethylene carbonate, a protective film is formed on the surface of the negative electrode. It follows that the reaction between the negative electrode and γ-butyrolactone can be further suppressed so as to further improve the large discharge characteristics and the cycle life. It is also possible for nonaqueous solvent used in the present invention to further contain at least one kind of third solvent selected from the group consisting of vinylene carbonate, propylene carbonate, diethyl carbonate, methyl ethyl carbonate, trifluoropropylene and an aromatic compound. In this case, the surface of the negative electrode is densely covered with a protective film so as to markedly suppress the reaction between the negative electrode and γ-butyrolactone. As a result, the large discharge characteristics and the cycle life can be further improved.

In the secondary battery of the present invention, the separator contains a porous sheet having an air permeability of 600 sec/100 cm³ or less use of the particular separator makes it possible to allow the nonaqueous electrolyte containing γ-butyrolactone to permeate uniformly into the separator. As a result, the ionic conductance of the separator can be improved so as to improve the large discharge characteristics and the cycle life.

In the secondary battery of the present invention, the positive electrode and the separator are adhered to each other by an adhesive polymer present in at least a part of the boundary between the positive electrode and the separator. Likewise, the negative electrode and the separator are adhered to each other by an adhesive polymer present in at least a part of the boundary between the negative electrode and the separator. As a result, elevation of an internal impedance accompanying the progress of the charge-discharge cycles can be suppressed so as to improve the cycle life. At the same time, the gas generation during storage of the secondary battery under high temperatures can be further suppressed.

In the secondary battery of the present invention, an adhesive polymer is dotted inside the positive electrode and the separator and at the interface between the positive electrode and the separator to allow these positive electrode and the separator to form an integral structure. Likewise, an adhesive polymer is dotted inside the negative electrode and the separator and at the interface between the negative electrode and the separator to allow these negative electrode and the separator to form an integral structure. It follows that it is possible to improve the bonding strength between the positive electrode and the separator and the bonding strength between the negative electrode and the separator while suppressing the internal resistance at a low level. As a result, elevation of the internal impedance can be suppressed so as to improve the cycle life. At the same time, the gas generation can be suppressed more effectively during storage of the secondary battery under high temperatures.

In the secondary battery of the present invention, the positive electrode, the negative electrode and the separator can be allowed to have an integral structure by the thermal curing of the binder contained in the positive and negative electrodes. As a result, the internal impedance in the initial period of the charge-discharge cycle can be suppressed and the internal impedance can be maintained in spite of the progress of the charge-discharge cycles so as to further improve the cycle life. At the same time, the gas generation can be suppressed during storage of the secondary battery under high temperatures.

The nonaqueous electrolyte secondary battery according to the present invention comprises an electrode group including a collector and a positive electrode layer containing an active material and formed on one surface or both surfaces of the collector, a negative electrode including a collector and a negative electrode layer containing a material capable of absorbing and desorbing lithium ions and formed on one surface or both surfaces of the collector, and a separator interposed between the positive electrode and the negative electrode, a nonaqueous electrolyte including a nonaqueous solvent and a lithium salt dissolved in the nonaqueous solvent, and a jacket housing the electrode group. The jacket is made of a sheet having a thickness of 0.5 mm or less including a resin layer. The porosity of the positive electrode layer is lower than that of the negative electrode layer. Also, the thickness of the positive electrode layer is 10 to 100 μm. Further, the nonaqueous solvent contains 40 to 95% by volume of γ-butyrolactone based on the total amount of the nonaqueous solvent.

The secondary battery of the particular construction permits suppressing the gas generation and, thus, prevents the jacket made of a sheet having a thickness of 0.5 mm or less including a resin layer from being swollen. It follows that it is possible to use a jacket light in weight. In addition, it is possible to maintain large discharge characteristics and charge-discharge cycle characteristics sufficiently satisfactory for the practical use of the battery. It follows that the present invention provides a nonaqueous electrolyte secondary battery excellent in large discharge characteristics, having a long life, and exhibiting a high weight energy density.

Preferred Examples of the present invention will now be described in detail.

Example 1

Manufacture of Positive Electrode

First, 91 wt % of a lithium cobalt oxide ($Li_xCoO_2$: $0 \leq X \leq 1$) powder, 3.5 wt % of acetylene black, 3.5 wt % of graphite, 2 wt % of an ethylenepropylenediene monomer (EPDM) powder as a binder, and toluene were mixed. The two surfaces of a collector made of a porous aluminum foil (15 µm thick) having 0.5 mm diameter pores at a ratio of 10 pores per 10 $cm^2$ were coated with the resultant mixture. This collector was pressed to manufacture a positive electrode having an electrode density of 3 $g/cm^3$ in which positive electrode layers were carried by the two surfaces of the collector.

<Manufacture of Negative Electrode>

93 wt % of a powder of mesophase pitch-based carbon fibers heat-treated at 3,000° C. (fiber diameter=8 µm, average fiber length=20 µm, and average interplanar spacing ($d_{002}$)=0.3360 nm) as a carbon material and 7 wt % of polyvinylidene fluoride (PVdF) as a binder were mixed. A collector made of a porous copper foil (15 µm thick) having 0.5 mm diameter pores at a ratio of 10 pores per 10 $cm^2$ was coated with the resultant mixture. This collector was dried and pressed to manufacture a negative electrode having an electrode density of 1.3 $g/cm^3$ in which negative electrode layer were carried by the surface of the collector.

<Separator>

A separator made of a porous polyethylene film which had a thickness of 25 µm, a heat shrinkage of 20% upon being left to stand at 120° C. for 1 hr, and a porosity of 50% was prepared.

<Preparation of Nonaqueous Electrolyte>

A nonaqueous electrolyte was prepared by dissolving 1.5 mol/l of lithium borofluoride ($LiBF_4$) in a solvent mixture (mixing volume ratio 25:75) of ethylene carbonate (EC) and γ-butyrolactone (BL).

<Manufacture of Electrode Group>

A band-like positive electrode lead was welded to the collector of the positive electrode, and a band-like negative electrode lead was welded to the collector of the negative electrode. Subsequently, a laminate structure consisting of the positive electrode, the separator and the negative electrode laminated in the order mentioned was spirally wound, followed by flattening the spiral structure to obtain a flat electrode group.

A 100 µm thick laminate film formed by covering the two surfaces of an aluminum foil with polypropylene, was molded into a bag shape. The electrode group was housed in this bag such that the stacked section was seen through the opening of the bag. 0.3 wt % of polyvinylidene fluoride (PVdF) as an adhesive polymer was dissolved in dimethylformamide (boiling point=153° C.) as an organic solvent. The resultant solution was injected into the electrode group in the laminate film such that the amount per 100 mAh battery capacity was 0.2 ml. In this manner, the solution was allowed to penetrate into the electrode group and adhere to the entire surfaces of the electrode group.

Next, the electrode group in the laminate film was vacuum-dried at 80° C. for 12 hr to evaporate the organic solvent.

In this electrode group, the adhesive polymer was held in each of the void of the positive electrode, the void of negative electrode, and the void of separator. A porous adhesive layer was formed on the surfaces of the electrode group. The total amount of PVdF per 100 mAh battery capacity was 0.6 mg. Note that the total amount of adhesive polymer per 100 mAh battery capacity was calculated from an increase in the weight from that of the electrode group before impregnating the electrode group with the adhesive polymer solution.

Figure 2:
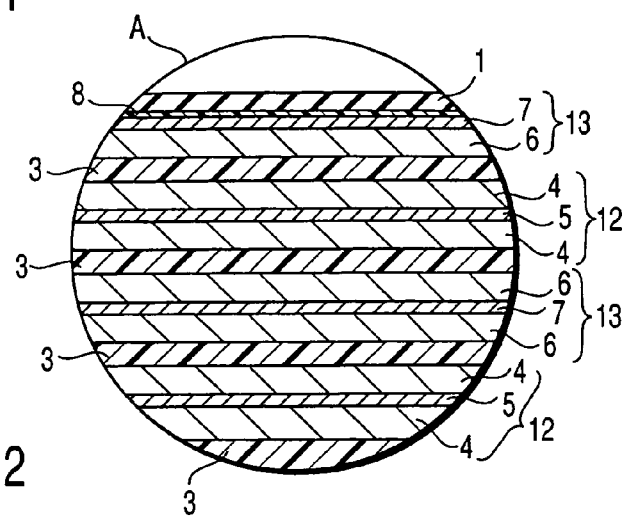
FIG. 2 is a cross sectional showing in a magnified fashion a portion A shown in FIG. 1.
Figure 3:
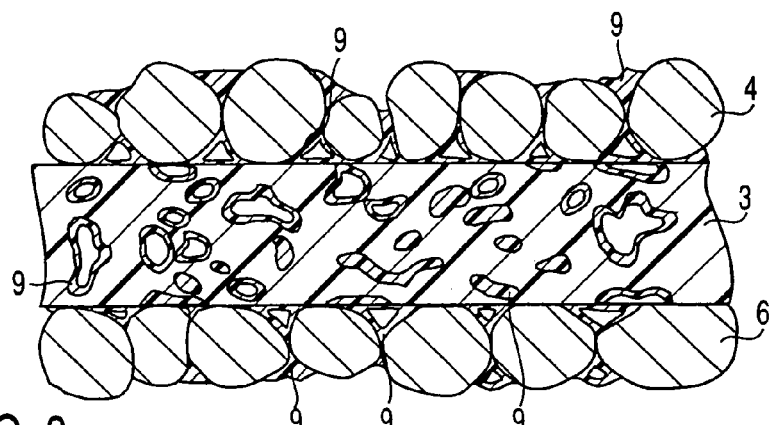
FIG. 3 schematically shows the boundary regions between the positive electrode and the separator and between the separator and the negative electrode in the secondary battery shown in FIG. 1.

The nonaqueous electrolyte was injected into the electrode group in the laminate film such that the amount per 1 Ah battery capacity was 4.7 g (0.47 g per 100 mAh), thereby assembling a thin nonaqueous electrolyte secondary battery (battery unit) 3 mm thick, 40 mm wide, and 70 mm high, having the structure shown in FIGS. 1 and 2 described earlier.

An initial charging treatment was applied to the nonaqueous electrolyte secondary battery (battery unit) thus prepared, as follows. In the first step, the battery unit was left to stand under such a high temperature as 40° C. for 5 hours, followed by charging the battery unit under a charging rate of 0.2 C (120 mA) for 10 hours. As a result, the battery voltage was increased to 4.2V. The charging was performed under a constant current and a constant voltage. Then, the battery unit was discharged at a rate of 0.2 C to a battery voltage of 2.7V. Further, a second cycle of the charging was performed under the conditions similar to those of the initial charging (first cycle) so as to obtain a thin nonaqueous electrolyte secondary battery.

The capacity of the nonaqueous electrolyte secondary battery was measured, and the internal impedance (mΩ) of the battery at 1 kHz was measured. In order to examine the large discharge characteristics of the nonaqueous electrolyte secondary battery at room temperature (20° C.), the capacity retention rate in the discharge step at 2 C was measured. Also, in order to examine the charge-discharge cycle characteristics, the secondary battery was charged at 0.5 C for 3 hours under a constant current and a constant voltage to obtain a battery voltage of 4.2V, followed by discharge at 1 C to lower the battery voltage to 2.7V. The charge-discharge cycle described above was repeated to measure the capacity retention rate after 300 charge-discharge cycles. Also, after charging to 4.2V of the battery voltage, the battery was stored at 85° C. for 120 hours so as to measure a swelling of the battery after the storage. Table 1 shows the electrolyte composition, initial charging conditions, and the battery characteristics.

Examples 2 to 7

A thin nonaqueous electrolyte secondary battery was obtained as in Example 1, except that the composition of the solvent for the electrolyte was changed as shown in Table 1, so as to evaluate the battery. The electrolyte composition, the initial charging conditions, and the battery characteristics for each of these Examples are shown in Table 1.

Example 8

A thin nonaqueous electrolyte secondary battery was obtained as in Example 1, except that an aluminum can having a thickness of 0.2 mm was used as the jacket, an adhesive polymer was not used, and that the secondary battery was sized at 3.2 mm in thickness, 40 mm in width and 70 mm in height, so as to evaluate the secondary battery. The electrolyte composition, the initial charging conditions, and the battery characteristics for Example 8 are also shown in Table 1.

Examples 9 to 11

A thin nonaqueous electrolyte secondary battery was obtained as in Example 1, except that the temperature in the initial charging step was changed as shown in Table 1, so as to evaluate the battery. The electrolyte composition, the initial charging conditions, and the battery characteristics for each of these Examples are shown in Table 1.

Example 12 TO 13

A thin nonaqueous electrolyte secondary battery was obtained as in Example 1, except that the composition of the solvent for the electrolyte was changed as shown in Table 1, so as to evaluate the battery. The electrolyte composition, the initial charging conditions, and the battery characteristics for each of these Examples are shown in Table 1.

Comparative Example 1

A thin nonaqueous electrolyte secondary battery was obtained as in Example 1, except that the nonaqueous electrolyte used was prepared by dissolving 1.5 mol/l of $LiBF_4$ in 100% of BL so as to evaluate the battery. The electrolyte composition, the initial charging conditions, and the battery characteristics for Comparative Example 1 are shown in Table 2.

Comparative Example 2

A thin nonaqueous electrolyte secondary battery was obtained as in Example 1, except that the nonaqueous electrolyte used was prepared by dissolving 1.5 mol/l of $LiBF_4$ in a mixed solvent consisting of BL, EC and MEC mixed at a volume ratio of 50:25:25 so as to evaluate the battery. The electrolyte composition, the initial charging conditions, and the battery characteristics for Comparative Example 2 are also shown in Table 2.

Comparative Example 3

A thin nonaqueous electrolyte secondary battery was obtained as in Example 1, except that 1.5 mol/l of $LiBF_4$ was dissolved in a mixed solvent consisting of BL and EC mixed at a volume ratio of 50:50 for preparing the nonaqueous electrolyte used so as to evaluate the battery. The electrolyte composition, the initial charging conditions, and the battery characteristics for Comparative Example 3 are also shown in Table 2.

Comparative Example 4

A thin nonaqueous electrolyte secondary battery was obtained as in Example 1, except that 1 mol/l of $LiPF_6$ was dissolved in a mixed solvent consisting of BL and MEC mixed at a volume ratio of 25:75 for preparing the nonaqueous electrolyte used so as to evaluate the battery. The electrolyte composition, the initial charging conditions, and the battery characteristics for Comparative Example 4 are also shown in Table 2.

Comparative Example 5

A thin nonaqueous electrolyte secondary battery was obtained as in Example 1, except that 1.5 mol/l of $LiBF_4$ was dissolved in a mixed solvent consisting of BL and EC mixed at a volume ratio of 25:75 for preparing the nonaqueous electrolyte used so as to evaluate the battery. The electrolyte composition, the initial charging conditions, and the battery characteristics for Comparative Example 5 are also shown in Table 2.

Comparative Example 6

A thin nonaqueous electrolyte secondary battery was obtained as in Example 1, except that 0.8 mol/l of $LiPF_6$ was dissolved in a mixed solvent consisting of BL and EC mixed at a volume ratio of 50:50 for preparing the nonaqueous electrolyte used, and that the initial charging was carried out at 25° C. so as to evaluate the battery. The electrolyte composition, the initial charging conditions, and the battery characteristics for Comparative Example 6 are also shown in Table 2.

Comparative Example 7

A thin nonaqueous electrolyte secondary battery was obtained as in Example 8, except that 1.5 mol/l of $LiBF_4$ was dissolved in a mixed solvent consisting of BL and EC mixed at a volume ratio of 50:50 for preparing the nonaqueous electrolyte used, and that the initial charging was carried out at 25° C. so as to evaluate the battery. The electrolyte composition, the initial charging conditions, and the battery characteristics for Comparative Example 7 are also shown in Table 2.

Comparative Example 8

A thin nonaqueous electrolyte secondary battery was obtained as in Example 1, except that 1.5 mol/l of $LiBF_4$ was dissolved in a mixed solvent consisting of BL and EC mixed at a volume ratio of 99:1 for preparing the nonaqueous electrolyte used, and that the initial charging was carried out at 25° C. so as to evaluate the battery. The electrolyte composition, the initial charging conditions, and the battery characteristics for Comparative Example 8 are also shown in Table 2.

Comparative Example 9

A thin nonaqueous electrolyte secondary battery was obtained as in Example 1, except that 1.5 mol/l of $LiBF_4$ was dissolved in a mixed solvent consisting of BL, EC and DEC mixed at a volume ratio of 50:25:25 for preparing the nonaqueous electrolyte used so as to evaluate the battery. The electrolyte composition, the initial charging conditions, and the battery characteristics for Comparative Example 9 are also shown in Table 2.

Comparative Example 10

A thin nonaqueous electrolyte secondary battery was obtained as in Example 1, except that 1.5 mol/l of $LiBF_4$ was dissolved in a mixed solvent consisting of BL, EC and MEC mixed at a volume ratio of 50:25:25 for preparing the nonaqueous electrolyte used so as to evaluate the battery. The electrolyte composition, the initial charging conditions, and the battery characteristics for Comparative Example 10 are also shown in Table 2.

Comparative Example 11

A thin nonaqueous electrolyte secondary battery was obtained as in Example 1, except that 1.5 mol/l of $LiBF_4$ was dissolved in a mixed solvent consisting of BL, PC and EC mixed at a volume ratio of 50:25:25 for preparing the non-aqueous electrolyte used so as to evaluate the battery. The electrolyte composition, the initial charging conditions, and the battery characteristics for Comparative Example 11 are also shown in Table 2.

TABLE 1

|  | Electrolyte composition | | | Initial charging conditions | | |
| --- | --- | --- | --- | --- | --- | --- |
|  | Solvent | Electrolytic salt | Electrolytic concentration | Temperature | Charging rate | Capacity (Ah) |
| Example 1 | 75% BL 25% EC | $LiBF_4$ | 1.5 mol/l | 40° C. | 0.2 C | 0.60 |
| Example 2 | 90% BL 10% EC | $LiBF_4$ | 1.5 mol/l | 40° C. | 0.2 C | 0.62 |
| Example 3 | 95% BL 5% EC | $LiBF_4$ | 1.5 mol/l | 40° C. | 0.2 C | 0.63 |
| Example 4 | 60% BL 40% EC | $LiBF_4$ | 1.5 mol/l | 40° C. | 0.2 C | 0.57 |
| Example 5 | 75% BL 15% EC 10% DEC | $LiBF_4$ | 1.5 mol/l | 40° C. | 0.2 C | 0.65 |
| Example 6 | 75% BL 15% EC 10% MEC | $LiBF_4$ | 1.5 mol/l | 40° C. | 0.2 C | 0.65 |
| Example 7 | 75% BL 25% EC | $LiPF_6$ | 0.8 mol/l | 40° C. | 0.2 C | 0.60 |
| Example 8 | 75% BL 25% EC | $LiBF_4$ | 1.5 mol/l | 40° C. | 0.2 C | 0.60 |
| Example 9 | 75% BL 25% EC | $LiBF_4$ | 1.5 mol/l | 30° C. | 0.2 C | 0.50 |
| Example 10 | 75% BL 25% EC | $LiBF_4$ | 1.5 mol/l | 60° C. | 0.2 C | 0.62 |
| Example 11 | 75% BL 25% EC | $LiBF_4$ | 1.5 mol/l | 80° C. | 0.2 C | 0.45 |
| Example 12 | 55% BL 45% EC | $LiBF_4$ | 1.5 mol/l | 40° C. | 0.2 C | 0.57 |
| Example 13 | 65% BL 35% EC | $LiBF_4$ | 1.5 mol/l | 40° C. | 0.2 C | 0.60 |

|  | Internal impedance (m·Ω) | Product between capacity and internal impedance (m·ΩAh) | Capacity retention rate at 2 C discharge step (%) | Capacity retention rate after 300 cycles (%) | Swelling after storage at 85° C. (%) |
| --- | --- | --- | --- | --- | --- |
| Example 1 | 80 | 48 | 85 | 90 | 3 |
| Example 2 | 75 | 46.5 | 90 | 90 | 2 |
| Example 3 | 70 | 44.1 | 90 | 85 | 1 |
| Example 4 | 90 | 51.3 | 70 | 80 | 5 |
| Example 5 | 65 | 42.25 | 90 | 93 | 8 |
| Example 6 | 65 | 42.25 | 90 | 94 | 8 |
| Example 7 | 80 | 48 | 80 | 80 | 5 |
| Example 8 | 85 | 51 | 85 | 90 | 0.5 |
| Example 9 | 100 | 50 | 60 | 80 | 3 |
| Example 10 | 75 | 46.5 | 85 | 85 | 3 |
| Example 11 | 100 | 45 | 50 | 70 | 2 |
| Example 12 | 90 | 51.3 | 65 | 82 | 5 |
| Example 13 | 85 | 51 | 83 | 90 | 3 |

TABLE 2

| | Electrolyte composition | | | Initial charging conditions | | Capacity (Ah) |
|---|---|---|---|---|---|---|
| | Solvent | Electrolytic salt | Electrolytic concentration | Temperature | Charging rate | |
| Comparative example 1 | 100% BL | $LiBF_4$ | 1.5 mol/l | 40° C. | 0.2 C | 0.4 |
| Comparative Example 2 | 50% BL 25% EC 25 MEC | $LiBF_4$ | 1.5 mol/l | 40° C. | 0.2 C | 0.4 |
| Comparative example 3 | 50% BL 50% EC | $LiBF_4$ | 1.5 mol/l | 25° C. | 1 C | 0.4 |
| Comparative example 4 | 25% EC 75% MEC | $LiPF_6$ | 1 mol/l | 40° C. | 0.2 C | 0.6 |
| Comparative example 5 | 25% BL 75% EC | $LiBF_4$ | 1.5 mol/l | 40° C. | 0.2 C | 0.3 |
| Comparative example 6 | 50% BL 50% EC | $LiPF_6$ | 0.8 mol/l | 25° C. | 0.2 C | 0.3 |
| Comparative example 7 | 50% BL 50% EC | $LiBF_4$ | 1.5 mol/l | 25° C. | 0.2 C | 0.3 |
| Comparative example 8 | 99% BL 1% EC | $LiBF_4$ | 1.5 mol/l | 25° C. | 0.2 C | 0.3 |
| Comparative example 9 | 50% BL 25% EC 25% DEC | $LiBF_4$ | 1.5 mol/l | 40° C. | 0.2 C | 0.4 |
| Comparative example 10 | 50% BL 25% EC 25% MEC | $LiBF_4$ | 1.5 mol/l | 40° C. | 0.2 C | 0.4 |
| Comparative example 11 | 50% BL 25% EC 25% PC | $LiBF_4$ | 1.5 mol/l | 40° C. | 0.2 C | 0.25 |

| | Internal impedance (m·Ω) | Product between capacity and internal impedance (m·ΩAh) | Capacity retention rate at 2 C discharge step (%) | Capacity retention rate after 300 cycles (%) | Swelling after storage at 85° C. (%) |
|---|---|---|---|---|---|
| Comparative example 1 | 300 | 120 | 10 | 10 | 1 |
| Comparative example 2 | 150 | 60 | 30 | 50 | 5 |
| Comparative example 3 | 300 | 120 | 40 | 20 | 3 |
| Comparative example 4 | 80 | 48 | 20 | 85 | 50 |
| Comparative example 5 | 500 | 150 | 10 | 20 | 20 |
| Comparative example 6 | 400 | 120 | 30 | 20 | 100 |
| Comparative example 7 | 400 | 120 | 20 | 50 | 10 |
| Comparative example 8 | 400 | 120 | 30 | 10 | 10 |
| Comparative example 9 | 150 | 60 | 50 | 60 | 100 |
| Comparative example 10 | 150 | 60 | 60 | 60 | 100 |
| Comparative example 11 | 300 | 75 | 40 | 20 | 5 |

As apparent from Tables 1 and 2, the nonaqueous electrolyte secondary battery according to any of Examples 1 to 13 comprising a nonaqueous electrolyte prepared by using a nonaqueous-solvent containing BL in an amount larger than 50% by volume and not larger than 95% by volume makes it possible to prevent the jacket from being swollen during storage of the secondary battery under high temperatures and to improve the discharge capacity at 2 C and the capacity retention rate after 300 charge-discharge cycles.

On the other hand, the secondary battery according to any of Comparative Examples 1 to 3 is certainly capable of suppressing the swelling of the jacket during storage of the secondary battery under high temperatures. However, the secondary batteries of these Comparative Examples were found to be inferior to the secondary batteries of Examples 1 to 13 of the present invention in the discharge capacity at 2 C and in the capacity retention rate after 300 charge-discharge cycles. Also, the secondary batteries of Comparative Examples 4 to 11 were found to be inferior to the secondary batteries of Examples 1 to 13 of the present invention in the swelling of the jacket during storage of the secondary battery under high temperatures. Incidentally, the nonaqueous electrolyte contained in the secondary battery of Comparative Example 1 corresponds to that disclosed in Japanese Patent Disclosure No. 11-97062 referred to previously. Also, the nonaqueous electrolyte contained in the secondary battery of Comparative Example 11 corresponds to that disclosed in Japanese Patent Disclosure No. 4-14769 referred to previously.

Example 14

A thin nonaqueous electrolyte secondary battery was obtained as in Example 1, except that an aluminum can having a thickness of 0.35 mm was used as a jacket and that thickness of the electrode group was decreased to allow the prepared secondary battery to be sized as in Example 1, i.e., 3 mm in thickness, 40 mm in width, and 70 mm in height. The secondary battery for Example 14 was 0.4 Ah.

Example 15

A thin nonaqueous electrolyte secondary battery was obtained as in Example 1, except that the nonaqueous electrolyte used was prepared by dissolving 1.5 mol/l of $LiBF_4$ in a mixed nonaqueous solvent consisting of 24% by volume of ethylene carbonate (EC), 75% by volume of γ-butyrolactone (BL) and 1% by volume of vinylene carbonate (VC).

Example 16

A thin nonaqueous electrolyte secondary battery was obtained as in Example 1, except that the nonaqueous electrolyte used was prepared by dissolving 1.5 mol/l of $LiBF_4$ in a mixed nonaqueous solvent consisting of 23% by volume of ethylene carbonate (EC), 75% by volume of γ-butyrolactone (BL) and 2% by volume of vinylene carbonate (VC).

Example 17

A thin nonaqueous electrolyte secondary battery was obtained as in Example 1, except that the nonaqueous electrolyte used was prepared by dissolving 1.5 mol/l of $LiBF_4$ in a mixed nonaqueous solvent consisting of 24.5% by volume of ethylene carbonate (EC), 75% by volume of γ-butyrolactone (BL) and 0.5% by volume of vinylene carbonate (VC).

Example 18

A thin nonaqueous electrolyte secondary battery was obtained as in Example 1, except that the nonaqueous electrolyte used was prepared by dissolving 1.5 mol/l of $LiBF_4$ in a mixed nonaqueous solvent consisting of 25% by volume of ethylene carbonate (EC), 74% by volume of γ-butyrolactone (BL) and 1% by volume of toluene.

Each of the secondary batteries obtained in Examples 15 to 18 was tested as in Example 1 for the battery capacity, the internal impedance, the capacity retention rate after the discharge at 2 C, the capacity retention rate after 300 charge-discharge cycles, and the swelling after storage of the secondary battery at 85° C. Table 3 shows the results.

TABLE 3

|  | Kind of third solvent | Third solvent content (vol %) | Capacity (Ah) | Internal impedance (m·Ω) | Product between capacity and internal impedance (m·ΩAh) | Capacity retention rate at 2 C discharge step (%) | Capacity retention rate after 300 cycles (%) | Swelling after storage at 85° C. (%) |
|---|---|---|---|---|---|---|---|---|
| Example 15 | VC | 1 | 0.62 | 75 | 46.5 | 90 | 94 | 4 |
| Example 16 | VC | 2 | 0.62 | 75 | 46.5 | 90 | 95 | 4.5 |
| Example 17 | VC | 0.5 | 0.61 | 78 | 47.58 | 88 | 92 | 3 |
| Example 18 | Toluene | 1 | 0.62 | 75 | 46.5 | 85 | 88 | 3 |

As apparent from Table 3, the secondary battery obtained in each of Examples 15 to 17 provided with a nonaqueous electrolyte containing BL in an amount larger than 50% by volume and not larger than 95% by volume, EC and VC was found to be superior to the secondary battery obtained in Example 1 in the capacity retention rate after 300 charge-discharge cycles. On the other hand, the secondary battery obtained in Example 18 provided with a nonaqueous electrolyte containing BL in an amount larger than 50% by volume and not larger than 95% by volume, EC and aromatic compound was found to be superior to the secondary battery obtained in Example 1 in the capacity retention rate after 300 charge-discharge cycles.

Example 19

A thin nonaqueous electrolyte secondary battery was obtained as in Example 1, except that a porous polyethylene film having a thickness of 25 μm, a thermal shrinkage of 20% upon being left to stand at 120° C. for an hour, an air permeability of 90 sec/100 cm³, and a porosity of 50% was used as the separator.

Example 20

A thin nonaqueous electrolyte secondary battery was obtained as in Example 19, except that the air permeability of the porous polyethylene film used as the separator was set at 580 sec/100 cm³.

Example 21

A thin nonaqueous electrolyte secondary battery was obtained as in Example 19, except that the air permeability of the porous polyethylene film used as the separator was set at 400 sec/100 cm³.

Example 22

A thin nonaqueous electrolyte secondary battery was obtained as in Example 19, except that the air permeability of the porous polyethylene film used as the separator was set at 150 sec/100 cm³.

Each of the secondary batteries obtained in Examples 19 to 22 was tested as in Example 1 for the battery capacity, the internal impedance, the capacity retention rate after the discharge at 2 C, the capacity retention rate after 300 charge-discharge cycles, and the swelling after storage of the secondary battery at 85° C. Table 4 shows the results.

TABLE 4

|  | Air permeability of separator (sec/100 cm) | Capacity (Ah) | Internal impedance (m · Ω) | Product between capacity and internal impedance (m · ΩAh) | Capacity retention rate at 2 C discharge step (%) | Capacity retention rate after 300 cycles (%) | Swelling after storage at 85° C. (%) |
|---|---|---|---|---|---|---|---|
| Example 19 | 90 | 0.61 | 70 | 42 | 90 | 95 | 3 |
| Example 20 | 580 | 0.55 | 120 | 60 | 50 | 70 | 3 |
| Example 21 | 400 | 0.56 | 100 | 55 | 60 | 75 | 3 |
| Example 22 | 150 | 0.58 | 90 | 52.2 | 86 | 83 | 3 |

Example 23

An electrode group was prepared as in Example 1, except that an adhesive polymer was not added for preparation of the electrode group. The electrode group thus prepared was housed in an aluminum can having a thickness of 0.2 mm, which was used as a jacket. Then, the jacket was pressed under a pressure of 10 kg/cm$^2$ in a thickness direction of the electrode group under a high temperature vacuum of 80° C. so as to thermally cure the binder contained in each of the positive electrode and the negative electrode, thereby forming an integral structure.

On the other hand, a nonaqueous electrolyte was prepared by dissolving 1.5 mol/l of LiBF$_4$ in a mixed nonaqueous solvent consisting of 24.5% by volume of ethylene carbonate (EC), 75% by volume of r-butyrolactone (BL), and 0.5% by volume of vinylene carbonate (VC). The nonaqueous electrolyte thus prepared was poured into the aluminum can (jacket) such that the electrolyte was permeated into the electrode group at a rate of 4.7 g per 1 Ah of the battery capacity, followed by sealing the opening of the aluminum can, thereby obtaining a nonaqueous electrolyte secondary battery sized at 3.2 mm in thickness, 40 mm in width and 70 mm in height.

Example 24

An electrode group was prepared as in Example 1, except that an adhesive polymer was not added for preparation of the electrode group. The electrode group thus prepared was housed in an aluminum can having a thickness of 0.2 mm, which was used as a jacket. Then, the jacket was pressed under a pressure of 10 kg/cm$^2$ in a thickness direction of the electrode group under a high temperature vacuum of 80° C. so as to thermally cure the binder contained in each of the positive electrode and the negative electrode, thereby forming an integral structure.

On the other hand, a nonaqueous electrolyte was prepared by dissolving 1.5 mol/l of LiBF$_4$ in a mixed nonaqueous solvent consisting of 23% by volume of ethylene carbonate (EC), 75% by volume of r-butyrolactone (BL), and 2% by volume of vinylene carbonate (VC). The nonaqueous electrolyte thus prepared was poured into the aluminum can (jacket) such that the electrolyte was permeated into the electrode group at a rate of 4.7 g per 1 Ah of the battery capacity, followed by sealing the opening of the aluminum can, thereby obtaining a nonaqueous electrolyte secondary battery sized at 3.2 mm in thickness, 40 mm in width and 70 mm in height.

Each of the secondary batteries obtained in Examples 23 to 24 was tested as in Example 1 for the battery capacity, the internal impedance, the capacity retention rate after the discharge at 2 C, the capacity retention rate after 300 charge-discharge cycles, and the swelling after storage of the secondary battery at 85° C. Table 5 shows the results.

TABLE 5

|  | Capacity (Ah) | Internal impedance (m · Ω) | Product between capacity and internal impedance (m Ω ·Ah) | Capacity retention rate at 2 C discharge step (%) | Capacity retention rate after 300 cycles (%) | Swelling after storage at 85° C. (%) |
|---|---|---|---|---|---|---|
| Example 23 | 0.61 | 78 | 47.58 | 88 | 92 | 0.5 |
| Example 24 | 0.62 | 75 | 46.5 | 90 | 95 | 0.7 |

As apparent from Table 5, each of the secondary batteries obtained in Examples 23 and 24 exhibited a high battery capacity, was high in the capacity retention rate in each of the 2 C discharging step and after 300 charge-discharge cycles, and was low in the swelling after storage of the secondary battery at 85° C.

Example 25

A nonaqueous secondary battery was prepared as in Example 1, except that used was a laminate film having a thickness of 500 μm, said laminate film consisting of an aluminum foil and polypropylene films formed on both surfaces of the aluminum foil, and that the battery was sized at 4 mm in thickness, 100 mm in width and 280 mm in height.

The secondary battery thus prepared was tested as in Example 1 for the capacity, the capacity retention rate during discharge at 2 C, the capacity retention rate after 300 charge-discharge cycles, and the swelling after storage at 85° C. The battery was found to have a capacity of 6 Ah, a capacity retention rate during discharge at 2 C of 85%, a capacity retention rate after 300 charge-discharge cycles of 90%, and a swelling after storage at 85° C. of 3%. These experimental data clearly support that, in the case of using a nonaqueous solvent containing BL in an amount larger than 50% by volume and not larger than 95% by volume, it is possible to use a laminate film having a thickness of 0.5 mm as a jacket of a large battery used in, for example, an electric car.

Example 26

Preparation of Positive Electrode

In the first step, 91% by weight of $Li_xCoO_2$ ($0 \leqq x \leqq 1$) powder, 2.5% by weight of acetylene black, 3% by weight of graphite and 4% by weight of polyvinylidene fluoride (PVdF) were added to a N-methyl pyrrolidone (NMP) to prepare a slurry, followed by coating the both surfaces of a collector consisting of an aluminum foil having a thickness of 10 μm with the resultant slurry and subsequently drying the coating. Then, the coated collector was pressed to prepare a positive electrode having a positive electrode layer held on each surface of the collector. The positive electrode layer had a density of 3.3 g/cm$^3$, a porosity of 34% and a thickness of 48 μm.

<Preparation of Negative Electrode>

In the first step, 93% by weight of a carbon material, i.e., a mesophase pitch based carbon fiber subjected to a heat treatment at 3000° C. and having a fiber diameter of 8 μm, an average fiber length of 20 μm, and an average interplanar spacing ($d_{002}$) of 0.3360 nm, and 7% by weight of polyvinylidene fluoride (PVdF) used as a binder were added to N-methyl pyrrolidone to prepare a slurry. Then, the both surfaces of a collector consisting of a copper foil having a thickness of 10 μm were coated with the resultant slurry, followed by drying the coating. Then, the coated collector was pressed to prepare a negative electrode having a negative electrode layer held on each surface of the collector. The negative electrode layer had a density of 1.3 g/cm$^3$, a porosity of 41% and a thickness of 45 μm.

<Separator>

A porous polyethylene film having a thickness of 20 μm and a porosity of 50% was used as a separator.

<Preparation of Electrode Group>

A laminate structure consisting of the positive electrode, the separator and the negative electrode laminated in the order mentioned was spirally wound, followed by flattening the spiral structure to obtain a flat electrode group having a thickness of 2.5 mm, a width of 30 mm and a height of 50 mm.

<Preparation of Nonaqueous Electrolyte>

A nonaqueous electrolyte was prepared by dissolving 1.5 mol/l of $LiBF_4$ in a mixed solvent consisting of ethylene carbonate (EC) and γ-butyrolactone (BL) mixed at a volume ratio of 25:75.

Then, a laminate film having a thickness of 100 μm and prepared by allowing the each surface of an aluminum foil to be covered with a polypropylene film. The laminate film thus prepared was shaped into a bag and the electrode group prepared as described above was housed in the bag. Under this condition, the both surfaces of the bag was nipped by a holder such that the thickness of the nipped bag was 2.7 mm. On the other hand, 0.3% by weight of an adhesive polymer of polyvinylidene fluoride (PVdF) was dissolved in an organic solvent of dimethyl formamide having a boiling point of 153° C. The resultant solution was poured into the electrode group housed in the laminate film at a rate of 0.6 ml per 100 mAh of the battery capacity. As a result, the solution permeated into the electrode group and was attached to the entire surface of the electrode group.

In the next step, a vacuum drying was applied at 80° C. to the electrode group housed in the laminate film for 12 hours so as to evaporate the organic solvents and to allow the pores of the positive electrode, the negative electrode and the separator to hold the adhesive polymer. At the same time, a porous adhesive layer was formed on the surface of the electrode group.

Further, the nonaqueous electrolyte was poured into the electrode group within the laminate film in an amount of 2 g per 1 Ah of the battery capacity so as to obtain a nonaqueous electrolyte secondary battery (battery unit) having a thickness of 3 mm, a width of 32 mm and a height of 35 mm.

An initial charging treatment was applied to the nonaqueous electrolyte secondary battery (battery unit) thus prepared, as follows. In the first step, the battery unit was left to stand under such a high temperature as 40° C. for 5 hours, followed by charging the battery unit under a charging rate of 0.2 C (120 mA) for 10 hours. As a result, the battery voltage was increased to 4.2V. The charging was performed under a constant current and a constant voltage. Then, the battery unit was discharged at a rate of 0.2 C to a battery voltage of 2.7V. Further, a second cycle of the charging was performed under the conditions similar to those of the initial charging (first cycle) so as to obtain a nonaqueous electrolyte secondary battery.

In order to examine the large discharge characteristics of the nonaqueous electrolyte secondary battery at room temperature (20° C.), the capacity retention rate in the discharge step at 3 C was measured. In this case, the discharge capacity at 0.2 C was used as the reference capacity. Also, in order to examine the charge-discharge cycle characteristics, the secondary battery was charged at 0.7 C for 3 hours under a constant current and a constant voltage to obtain a battery voltage of 4.2V, followed by discharge at 1 C to lower the battery voltage to 2.7V. The charge-discharge cycle described above was repeated to measure the capacity retention rate after 300 charge-discharge cycles. Also, after charging to 4.2V of the battery voltage, the battery was stored at 85° C. for 120 hours so as to measure a swelling of the battery after the storage. Table 6 shows the initial capacity of the battery, the thickness of the electrode-layer, the amount of γ-butyrolactone contained in the solvent of the electrolyte, and the battery characteristics.

Examples 27 to 37, Examples A, B and Comparative Examples 12 to 13

A thin nonaqueous electrolyte secondary battery was prepared as in Example 26, except that the thickness of one layer of each of the positive electrode layer and the negative electrode layer, and the amount of γ-butyrolactone contained in the solvent of the electrolyte were changed as shown in Table 6. Table 6 also shows the initial capacity of the battery, the thickness of the electrode layer, the amount of γ-butyrolactone contained in the solvent of the electrolyte, and the battery characteristics.

TABLE 6

| | Capacity (Ah) | Thickness of one layer of positive electrode (μm) | Thickness of one layer of negative electrode (μm) |
|---|---|---|---|
| Example 26 | 0.32 | 48 | 45 |
| Example 27 | 0.35 | 60 | 56 |
| Example 28 | 0.30 | 39 | 36 |
| Example 29 | 0.25 | 24 | 23 |
| Example 30 | 0.12 | 10 | 9.5 |
| Example 31 | 0.30 | 48 | 45 |
| Example 32 | 0.31 | 48 | 45 |
| Example 33 | 0.33 | 48 | 45 |
| Example 34 | 0.31 | 48 | 45 |
| Example 35 | 0.28 | 48 | 45 |
| Example 36 | 0.36 | 60 | 65 |
| Example 37 | 0.38 | 80 | 80 |
| Example A | 0.35 | 87 | 90 |
| Example B | 0.05 | 8 | 8 |
| Comparative example 12 | 0.30 | 105 | 108 |
| Comparative example 13 | 0.10 | 8 | 8 |

| | BL content (% by volume) | Capacity retention rate at 3C discharge step (%) | Capacity retention rate after 300 cycles (%) | Swelling after storage at 85° C. (%) |
|---|---|---|---|---|
| Example 26 | 75 | 96 | 90 | 3 |
| Example 27 | 75 | 92 | 80 | 3 |
| Example 28 | 75 | 98 | 93 | 3 |
| Example 29 | 75 | 99 | 94 | 3 |
| Example 30 | 75 | 98 | 88 | 2 |
| Example 31 | 60 | 90 | 80 | 4 |
| Example 32 | 70 | 95 | 82 | 3 |
| Example 33 | 90 | 97 | 92 | 2 |
| Example 34 | 95 | 98 | 80 | 1 |
| Example 35 | 40 | 80 | 80 | 6 |
| Example 36 | 75 | 90 | 82 | 3 |
| Example 37 | 75 | 80 | 75 | 3 |
| Example A | 75 | 50 | 50 | 3 |
| Example B | 75 | 80 | 85 | 2 |
| Comparative example 12 | 30 | 20 | 30 | 6 |
| Comparative example 13 | 30 | 40 | 60 | 6 |

To reiterate, the secondary battery for each of Examples 26 to 37, Examples A and B comprises a positive electrode having a positive electrode layer having a thickness of 10 to 100 μm, a jacket having a thickness of 0.3 mm or less, and a nonaqueous solvent containing 40 to 95% by weight of BL. As apparent from Table 6, the secondary battery for each of these Examples is capable of suppressing the swelling of the jacket during storage under high temperatures and permits improving the initial capacity, the discharge capacity at 3 C and the capacity retention rate after 300 charge-discharge cycles.

On the other hand, the secondary battery for Comparative Example 12 was found to be inferior to the secondary battery for each of the Examples of the present invention in the discharge capacity at 3 C and in the capacity retention rate after 300 charge-discharge cycles. Also, the secondary battery for Comparative Example 13 was found to be inferior in the discharge capacity at 3 C than that for the secondary battery for the Examples of the present invention.

Example 38

A thin nonaqueous electrolyte secondary battery was obtained as in Example 26, except that a nonaqueous electrolyte used was prepared by dissolving 1.5 mol/l of $LiBF_4$ in a mixed nonaqueous solvent consisting of 24.9% by volume of ethylene carbonate (EC), 75% by volume of γ-butyrolactone, and 0.1% by volume of vinylene carbonate (VC).

Example 39

A thin nonaqueous electrolyte secondary battery was obtained as in Example 26, except that a nonaqueous electrolyte used was prepared by dissolving 1.5 mol/l of $LiBF_4$ in a mixed nonaqueous solvent consisting of 24% by volume of ethylene carbonate (EC), 75% by volume of γ-butyrolactone, and 1% by volume of vinylene carbonate (VC).

Example 40

A thin nonaqueous electrolyte secondary battery was obtained as in Example 26, except that a nonaqueous electrolyte used was prepared by dissolving 1.5 mol/l of $LiBF_4$ in a mixed nonaqueous solvent consisting of 20% by volume of ethylene carbonate (EC), 75% by volume of γ-butyrolactone, and 5% by volume of vinylene carbonate (VC).

Example 41

A thin nonaqueous electrolyte secondary battery was obtained as in Example 26, except that a nonaqueous electrolyte used was prepared by dissolving 1.5 mol/l of $LiBF_4$ in a mixed nonaqueous solvent consisting of 25% by volume of ethylene carbonate (EC), 74% by volume of γ-butyrolactone, and 1% by volume of toluene.

The secondary battery obtained in each of Examples 38 to 41 was tested for the battery capacity, the capacity retention rate during discharge at 3 C, the capacity retention rate after 300 charge-discharge cycles, and the swelling after storage at 85° C., as in Example 26. Table 7 shows the results.

TABLE 7

| | Kind of third solvent | Third solvent content (vol %) | Capacity (Ah) | Capacity retention rate at 3 C discharge step (%) | Capacity retention rate after 300 cycles (%) | Swelling after storage at 85° C. (%) |
|---|---|---|---|---|---|---|
| Example 38 | VC | 0.1 | 0.32 | 96 | 92 | 3 |
| Example 39 | VC | 1 | 0.33 | 96 | 96 | 4 |
| Example 40 | VC | 5 | 0.30 | 92 | 93 | 6 |
| Example 41 | Toluene | 1 | 0.32 | 88 | 90 | 3 |

As apparent from Table 7, the secondary battery for each of Examples 38 to 40 comprising a nonaqueous electrolyte containing 40 to 95% by volume of BL, EC and VC was found to be superior to the secondary battery for Example 26 in the capacity retention rate after 300 charge-discharge cycles. On the other hand, the secondary battery for Example 41 comprising a nonaqueous electrolyte containing 40 to 95% by volume of BL, EC and aromatic compound was found to be superior to the secondary battery for Example 26 in the capacity retention rate after 300 charge-discharge cycles.

Example 42

A thin nonaqueous electrolyte secondary battery was obtained as in Example 26, except that a porous polyethylene film having a thickness of 25 μm, a thermal shrinkage of 20% upon being left to stand at 120° C. for an hour, an air permeability of 90 sec/100 cm³, and a porosity of 50% was used as a separator.

Example 43

A thin nonaqueous electrolyte secondary battery was obtained as in Example 42, except that a porous polyethylene film having an air permeability of 580 sec/100 cm³ was used as a separator.

Example 44

A thin nonaqueous electrolyte secondary battery was obtained as in Example 42, except that a porous polyethylene film having an air permeability of 400 sec/100 cm³ was used as a separator.

Example 45

A thin nonaqueous electrolyte secondary battery was obtained as in Example 42, except that a porous polyethylene film having an air permeability of 150 sec/100 cm³ was used as a separator.

The secondary battery obtained in each of Examples 42 to 45 was tested for the battery capacity, the capacity retention rate during discharge at 3 C, the capacity retention rate after 300 charge-discharge cycles, and the swelling after storage at 85° C., as in Example 26. Table 8 shows the results.

electrolyte secondary battery having a thickness of 3 mm, a width of 32 mm and a height of 55 mm.

Example 47

An electrode group was prepared as in Example 26, except that an adhesive polymer was not added for preparation of the electrode group. The resultant electrode group was housed in an aluminum can having a thickness of 0.25 mm, which was used as a jacket. Then, the jacket was pressed under pressure of 10 kg/cm² in a thickness direction of the electrode group under a high temperature vacuum atmosphere of 80° C. so as to thermally cure the binder contained in the positive and negative electrode and, thus, to form an integral structure consisting of the positive electrode, the negative electrode and the separator.

On the other hand, a nonaqueous electrolyte was prepared by dissolving 1.5 mol/l of $LiBF_4$ in a mixed nonaqueous solvent consisting of 24% of ethylene carbonate (EC), 75% by volume of γ-butyrolactone and 2% by volume of vinylene carbonate (VC). The nonaqueous electrolyte thus prepared was poured into the electrode group in an amount of 4.7 g per 1 Ah of the battery capacity, followed by sealing the opening of the jacket, thereby obtaining a thin nonaqueous electrolyte secondary battery having a thickness of 3 mm, a width of 32 mm and a height of 55 mm.

The secondary battery obtained in each of Examples 46 to 47 was tested for the battery capacity, the capacity retention

TABLE 8

|  | Air permeability of separator (sec/100 cm) | Capacity (Ah) | Capacity retention rate at 3 C discharge step (%) | Capacity retention rate after 300 cycles (%) | Swelling after storage at 85° C. (%) |
| --- | --- | --- | --- | --- | --- |
| Example 42 | 90 | 0.31 | 97.5 | 95 | 3 |
| Example 43 | 580 | 0.25 | 80 | 70 | 2.8 |
| Example 44 | 400 | 0.26 | 85 | 75 | 2.8 |
| Example 45 | 150 | 0.28 | 95 | 88 | 3 |

Example 46

An electrode group was prepared as in Example 26, except that an adhesive polymer was not added for preparation of the electrode group. The resultant electrode group was housed in an aluminum can having a thickness of 0.18 mm, which was used as a jacket. Then, the jacket was pressed under pressure of 10 kg/cm² in a thickness direction of the electrode group under a high temperature vacuum atmosphere of 80° C. so as to thermally cure the binder contained in the positive and negative electrode and, thus, to form an integral structure consisting of the positive electrode, the negative electrode and the separator.

On the other hand, a nonaqueous electrolyte was prepared by dissolving 1.5 mol/l of $LiBF_4$ in a mixed nonaqueous solvent consisting of 24.5% of ethylene carbonate (EC), 75% by volume of γ-butyrolactone and 0.5% by volume of vinylene carbonate (VC). The nonaqueous electrolyte thus prepared was poured into the electrode group in an amount of 4.7 g per 1 Ah of the battery capacity, followed by sealing the opening of the jacket, thereby obtaining a thin nonaqueous rate during discharge at 3 C, the capacity retention rate after 300 charge-discharge cycles, and the swelling after storage at 85° C., as in Example 26. Table 9 shows the results.

TABLE 9

|  | Capacity (Ah) | Capacity retention rate at 3C discharge step (%) | Capacity retention rate after 300 cycles (%) | Swelling after storage at 85° C. (%) |
| --- | --- | --- | --- | --- |
| Example 46 | 0.32 | 96 | 95 | 0.5 |
| Example 47 | 0.33 | 96 | 97 | 0.6 |

As apparent from Table 9, the secondary battery for each of Examples 46 and 47 was found to have a high battery capacity, a high capacity retention rate during discharge at 3 C, a high capacity retention rate after 300 charge-discharge cycles, and to be capable of suppressing the swelling during storage at 85° C.

Example 48

A nonaqueous secondary battery was prepared as in Example 26, except that used was a laminate film having a thickness of 500 μm, said laminate film consisting of an aluminum foil and polypropylene films formed on both surfaces of the aluminum foil, and that the battery was sized at 4 mm in thickness, 80 mm in width and 220 mm in height.

The secondary battery thus prepared was tested as in Example 26 for the capacity, the capacity retention rate during discharge at 3 C, the capacity retention rate after 300 charge-discharge cycles, and the swelling after storage at 85° C. The battery was found to have a capacity of 3.2 Ah, a capacity retention rate during discharge at 3 C of 96%, a capacity retention rate after 300 charge-discharge cycles of 90%, and a swelling after storage at 85° C. of 3%. These experimental data clearly support that, in the case where the thickness of the positive electrode layer is set at 10 to 100 μm and where the nonaqueous solvent contains 40 to 95% by volume of BL, it is possible to use a laminate film having a thickness of 0.5 mm, as a jacket of a large battery used in, for example, an electric car.

As described above in detail, the present invention provides a nonaqueous electrolyte secondary battery that permits suppressing the deformation of the jacket during storage under high temperatures and also permits improving the weight energy density, the volume energy density, the large discharge characteristics, and the charge-discharge cycle characteristics.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A nonaqueous electrolyte secondary battery, comprising:
    an electrode group including a positive electrode, a negative electrode and a separator arranged between the positive electrode and the negative electrode, the positive electrode including a collector and a positive electrode layer that is formed on one or both surfaces of the collector and contains an active material, and the negative electrode including a collector and a negative electrode layer that is formed on one or both surfaces of the collector and contains a material for absorbing-desorbing lithium ions;
    a nonaqueous electrolyte impregnated in the electrode group and including a nonaqueous solvent and a lithium salt dissolved in the nonaqueous solvent, the nonaqueous solvent containing 40 to 95% by volume of γ-butyrolactone based on the total amount of the nonaqueous solvent; and
    a jacket for housing the electrode group, the jacket being made of a sheet which has a thickness of 0.05 mm to 0.35 mm and includes a resin layer,
    wherein the positive electrode layer has a porosity lower than that of the negative electrode layer, the positive electrode layer has a thickness of 10 to 60 μm, and the negative electrode layer has a thickness of 10 to 65 μm.

2. The secondary battery according to claim 1, wherein the porosity of the positive electrode layer falls within a range of 25 to 40%, and the porosity of the negative electrode layer falls within a range of 35 to 50%.

3. The secondary battery according to claim 1, wherein the nonaqueous solvent further contains ethylene carbonate.

4. The secondary battery according to claim 1, wherein the nonaqueous solvent further contains ethylene carbonate and at least one kind of a third solvent selected from a group consisting of propylene carbonate, vinylene carbonate, trifluoropropylene, diethyl carbonate, methyl ethyl carbonate and an aromatic compound.

5. The secondary battery according to claim 1, wherein the positive electrode and the separator are adhered to each other by an adhesive polymer present in at least part of a boundary therebetween, and the negative electrode and the separator are adhered to each other by an adhesive polymer present in at least part of a boundary therebetween.

6. The secondary battery according to claim 1, wherein each of the positive electrode and the negative electrode further contains a binder, and the positive electrode, the negative electrode and the separator are integrated with each other by a thermal curing of the binder.

7. The secondary battery according to claim 1, wherein the separator includes a porous sheet having an air permeability of 600 seconds/100 cm$^3$ or less.

8. The secondary battery according to claim 1, wherein either the collector of the positive electrode or the collector of the negative electrode has a thickness of 5 to 20 μm.

9. The secondary battery according to claim 1, wherein the material for absorbing-desorbing lithium ions is one of a carbonaceous material and a graphitized material which have been heat-treated at 500 to 3,000° C.

10. The secondary battery according to claim 1, wherein the material for absorbing-desorbing lithium ions is lithium titanium oxide.

11. The secondary battery according to claim 1, wherein the lithium salt includes $LiPF_6$ or $LiBF_4$.

12. A nonaqueous electrolyte secondary battery, comprising:
    an electrode group including a positive electrode, a negative electrode and a separator arranged between the positive electrode and the negative electrode, the positive electrode including a collector and a positive electrode layer that is formed on one or both surfaces of the collector and contains an active material, and the negative electrode including a collector and a negative electrode layer that is formed on one or both surfaces of the collector and contains a material for absorbing-desorbing lithium ions;
    a nonaqueous electrolyte impregnated in the electrode group and including a nonaqueous solvent and a lithium salt dissolved in the nonaqueous solvent, the nonaqueous solvent containing 40 to 95% by volume of γ-butyrolactone based on the total amount of the nonaqueous solvent; and
    a jacket for housing the electrode group, the jacket having a thickness of 0.05 mm to 0.3 mm,
    wherein the positive electrode layer has a porosity lower than that of the negative electrode layer, the positive electrode layer has a thickness of 10 to 60 μm, and the negative electrode layer has a thickness of 10 to 65 μm.

13. The secondary battery according to claim 12, wherein the porosity of the positive electrode layer falls within a range of 25 to 40%, and the porosity of the negative electrode layer falls within a range of 35 to 50%.

14. The secondary battery according to claim 12, wherein the nonaqueous solvent further contains ethylene carbonate.

15. The secondary battery according to claim 12, wherein the nonaqueous solvent further contains ethylene carbonate and at least one kind of a third solvent selected from a group consisting of propylene carbonate, vinylene carbonate, trifluoropropylene, diethyl carbonate, methyl ethyl carbonate and an aromatic compound.

16. The secondary battery according to claim 12, wherein the positive electrode and the separator are adhered to each other by an adhesive polymer present in at least part of a boundary therebetween, and the negative electrode and the separator are adhered to each other by an adhesive polymer present in at least part of a boundary therebetween.

17. The secondary battery according to claim 12, wherein each of the positive electrode and the negative electrode further contains a binder, and the positive electrode, the negative electrode and the separator are integrated with each other by a thermal curing of the binder.

18. The secondary battery according to claim 12, wherein the separator includes a porous sheet having an air permeability of 600 seconds/100 cm$^3$ or less.

19. The secondary battery according to claim 12, wherein either the collector of the positive electrode or the collector of the negative electrode has a thickness of 5 to 20 μm.

20. The secondary battery according to claim 12, wherein the material for absorbing-desorbing lithium ions is one of a carbonaceous material and a graphitized material which have been heat-treated at 500 to 3,000° C.

21. The secondary battery according to claim 12, wherein the material for absorbing-desorbing lithium ions is lithium titanium oxide.

22. The secondary battery according to claim 12, wherein the lithium salt includes $LiPF_6$ or $LiBF_4$.

23. The nonaqueous electrolyte secondary battery of claim 1, wherein the jacket is made of a single laminated film having a thickness of 0.05 mm to 0.15 mm.

24. The nonaqueous electrolyte secondary battery of claim 1, wherein the jacket is made of a laminated film comprising a metal layer having a thickness of 0.05 mm to 0.25 mm and at least one resin layer having a thickness of 0.05 to 0.25 mm.

25. The nonaqueous electrolyte secondary battery according to claim 24, wherein the jacket consists of a single metal layer and a single resin layer.

* * * * *